US010338594B2

(12) United States Patent
Long

(10) Patent No.: US 10,338,594 B2
(45) Date of Patent: Jul. 2, 2019

(54) NAVIGATION OF AUTONOMOUS VEHICLES TO ENHANCE SAFETY UNDER ONE OR MORE FAULT CONDITIONS

(71) Applicant: NIO USA, Inc., San Jose, CA (US)

(72) Inventor: Joseph William Long, Oceanside, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/457,926

(22) Filed: Mar. 13, 2017

(65) Prior Publication Data
US 2018/0259966 A1 Sep. 13, 2018

(51) Int. Cl.
G05D 1/02 (2006.01)
G05D 1/00 (2006.01)
(Continued)

(52) U.S. Cl.
CPC .......... *G05D 1/0214* (2013.01); *B60W 30/00* (2013.01); *G05D 1/0055* (2013.01);
(Continued)

(58) Field of Classification Search
CPC .. G05D 1/0214; G05D 1/0088; G05D 1/0246; G05D 1/0274; G06K 9/00798;
(Continued)

(56) References Cited

U.S. PATENT DOCUMENTS 3,790,277 A * 2/1974 Hogan ................. G01C 15/004
356/139.06
4,154,529 A * 5/1979 Dyott ..................... A61B 5/026
250/227.11
(Continued)

FOREIGN PATENT DOCUMENTS

EP 2410358 1/2012
EP 2524843 11/2012
(Continued)

OTHER PUBLICATIONS

Combining 3D Shape, Color, and Motion for Robust Anytime Tracking; Held, David, Levinson, Jesse, Thrun, Sebastian, Savarese, Silvio, Robotics: Science and Systems (RSS), Berkeley, California, USA (2014).
(Continued)

*Primary Examiner* — Courtney D Heinle
(74) *Attorney, Agent, or Firm* — Sheridan Ross P.C.

(57) ABSTRACT

Various embodiments relate generally to autonomous vehicles and associated mechanical, electrical and electronic hardware, computing software, including autonomy applications, image processing applications, etc., and computing systems, and wired and wireless network communications to facilitate autonomous control of vehicles, and, more specifically, to systems, devices, and methods configured to navigate autonomous vehicles under one or more fault conditions. In some examples, a method may include localizing an autonomous vehicle, accessing map data to identify safe zones, computing drive parameters and alternate drive parameters, detecting an anomalous event, and apply alternate drive parameters to a vehicle control unit.

20 Claims, 6 Drawing Sheets

(51) Int. Cl.
  *G06K 9/00* (2006.01)
  *G06K 9/62* (2006.01)
  *G06K 9/78* (2006.01)
  *B60W 30/00* (2006.01)
  *G08G 1/00* (2006.01)

(52) U.S. Cl.
  CPC ......... *G05D 1/0088* (2013.01); *G05D 1/0246* (2013.01); *G05D 1/0274* (2013.01); *G06K 9/00798* (2013.01); *G06K 9/00805* (2013.01); *G06K 9/6267* (2013.01); *G06K 9/78* (2013.01); *G08G 1/00* (2013.01); *G05D 2201/0213* (2013.01); *G06K 9/00818* (2013.01)

(58) Field of Classification Search
  CPC .... G06K 9/00805; G06K 9/6267; G06K 9/78; G06K 9/00818
  See application file for complete search history.

(56) References Cited

U.S. PATENT DOCUMENTS

| | | | | |
|---|---|---|---|---|
| 4,361,202 A * | 11/1982 | Minovitch | ......... | B60K 31/0008 104/88.02 |
| 4,516,158 A * | 5/1985 | Grainge | ......... | G01C 11/025 250/334 |
| 4,700,301 A * | 10/1987 | Dyke | ......... | G01S 5/16 180/169 |
| 4,709,195 A * | 11/1987 | Hellekson | ......... | G06K 7/10871 235/470 |
| 5,098,185 A * | 3/1992 | Watanabe | ......... | G01S 17/66 356/139.06 |
| 5,202,742 A * | 4/1993 | Frank | ......... | G01S 7/4811 180/167 |
| 5,220,507 A * | 6/1993 | Kirson | ......... | G01C 21/34 340/995.19 |
| 5,303,084 A * | 4/1994 | Pflibsen | ......... | G02B 27/09 359/503 |
| 5,337,189 A * | 8/1994 | Krawczyk | ......... | G01S 7/4812 356/28.5 |
| 5,375,059 A * | 12/1994 | Kyrtsos | ......... | B60K 31/0008 342/357.24 |
| 5,390,125 A | 2/1995 | Sennott et al. | | |
| 5,428,438 A * | 6/1995 | Komine | ......... | G01P 5/26 356/28.5 |
| 5,438,517 A | 8/1995 | Sennott et al. | | |
| 5,548,516 A * | 8/1996 | Gudat | ......... | G01S 19/11 701/23 |
| 5,555,503 A * | 9/1996 | Kyrtsos | ......... | G01S 19/11 342/357.24 |
| 5,558,370 A * | 9/1996 | Behr | ......... | B60R 21/0132 242/374 |
| 5,610,815 A | 3/1997 | Gudat et al. | | |
| 5,612,883 A * | 3/1997 | Shaffer | ......... | B60K 31/0008 340/435 |
| 5,615,116 A | 5/1997 | Gudat et al. | | |
| 5,629,855 A | 5/1997 | Kyrtsos et al. | | |
| 5,640,323 A | 6/1997 | Kleimenhagen et al. | | |
| 5,646,843 A | 7/1997 | Gudat et al. | | |
| 5,646,845 A | 7/1997 | Gudat et al. | | |
| 5,648,901 A | 7/1997 | Gudat et al. | | |
| 5,657,226 A | 8/1997 | Shin et al. | | |
| 5,680,306 A | 10/1997 | Shin et al. | | |
| 5,680,313 A | 10/1997 | Whittaker et al. | | |
| 5,684,696 A | 11/1997 | Rao et al. | | |
| 5,703,351 A * | 12/1997 | Meyers | ......... | G02B 3/06 250/201.2 |
| 5,716,032 A | 2/1998 | McIngvale | | |
| 5,838,562 A | 11/1998 | Gudat et al. | | |
| 5,956,250 A | 9/1999 | Gudat et al. | | |
| 5,959,552 A * | 9/1999 | Cho | ......... | B60R 19/38 180/167 |
| 6,046,800 A * | 4/2000 | Ohtomo | ......... | G01C 15/002 356/139.07 |
| 6,115,128 A * | 9/2000 | Vann | ......... | G01B 11/002 250/559.38 |
| 6,122,572 A * | 9/2000 | Yavnai | ......... | G05D 1/0088 342/13 |
| 6,151,539 A * | 11/2000 | Bergholz | ......... | G01S 13/931 340/435 |
| 6,264,353 B1 * | 7/2001 | Caraher | ......... | B60Q 1/2665 340/475 |
| 6,301,542 B1 * | 10/2001 | Kirchberger | ......... | B60K 31/0008 340/903 |
| 6,374,168 B1 * | 4/2002 | Fujii | ......... | B60R 22/44 180/268 |
| 6,438,472 B1 * | 8/2002 | Tano | ......... | G01C 21/26 701/25 |
| 6,502,016 B1 * | 12/2002 | Ozaki | ......... | E02F 3/841 701/23 |
| 6,626,463 B1 * | 9/2003 | Arima | ......... | B60R 21/013 280/735 |
| 6,728,616 B1 * | 4/2004 | Tabe | ......... | B60R 21/017 180/268 |
| 6,749,218 B2 * | 6/2004 | Breed | ......... | G08G 1/163 280/735 |
| 6,752,508 B2 * | 6/2004 | Kobayashi | ......... | B60Q 1/085 362/37 |
| 6,778,732 B1 * | 8/2004 | Fermann | ......... | G02B 27/09 359/642 |
| 7,036,128 B1 * | 4/2006 | Julia | ......... | G06F 9/465 707/E17.071 |
| 7,069,780 B2 | 7/2006 | Ander | | |
| 7,089,114 B1 * | 8/2006 | Huang | ......... | B60T 7/22 340/435 |
| 7,106,180 B1 * | 9/2006 | Pompei | ......... | A01M 29/18 116/22 A |
| 7,164,117 B2 * | 1/2007 | Breed | ......... | B60R 21/01516 250/208.1 |
| 7,248,342 B1 * | 7/2007 | Degnan | ......... | G01C 3/08 342/120 |
| 7,255,275 B2 * | 8/2007 | Gurevich | ......... | G06K 7/10584 235/436 |
| 7,259,838 B2 * | 8/2007 | Carlhoff | ......... | G01C 3/08 356/5.01 |
| 7,311,000 B2 * | 12/2007 | Smith | ......... | G01S 17/58 73/170.11 |
| 7,361,948 B2 * | 4/2008 | Hirano | ......... | G02B 5/284 257/294 |
| 7,417,716 B2 * | 8/2008 | Nagasaka | ......... | G01S 17/48 257/E25.032 |
| 7,426,429 B2 | 9/2008 | Tabe | | |
| 7,451,005 B2 * | 11/2008 | Hoffberg | ......... | G05B 15/02 700/83 |
| 7,544,945 B2 * | 6/2009 | Tan | ......... | G01S 7/4811 180/169 |
| 7,663,502 B2 | 2/2010 | Breed | | |
| 7,865,277 B1 * | 1/2011 | Larson | ......... | G05D 1/0206 114/221 A |
| 7,969,558 B2 * | 6/2011 | Hall | ......... | G01S 7/4813 356/141.5 |
| 7,979,175 B2 * | 7/2011 | Allard | ......... | G05D 1/0061 701/1 |
| 8,050,863 B2 * | 11/2011 | Trepagnier | ......... | B60W 30/00 180/167 |
| 8,123,642 B2 * | 2/2012 | Ishikawa | ......... | F16H 61/0021 475/116 |
| 8,126,642 B2 | 2/2012 | Trepagnier et al. | | |
| 8,346,480 B2 | 1/2013 | Trepagnier et al. | | |
| 8,392,064 B2 * | 3/2013 | Thrun | ......... | B62D 15/025 701/41 |
| 8,428,863 B2 * | 4/2013 | Kelly | ......... | B60T 7/18 52/578 |
| 8,428,864 B2 * | 4/2013 | Kelly | ......... | G01S 19/14 439/474 |
| 8,434,919 B2 * | 5/2013 | Schofield | ......... | B60Q 1/1423 362/466 |

(56) References Cited

U.S. PATENT DOCUMENTS

| | | | | |
|---|---|---|---|---|
| 8,447,509 B2* | 5/2013 | Kelly | G01M 17/0078 | 701/2 |
| 8,457,877 B2* | 6/2013 | Kelly | H01Q 1/084 | 343/882 |
| 8,477,290 B2* | 7/2013 | Yamada | G01C 3/08 | 356/3.01 |
| 8,550,196 B2* | 10/2013 | Ross | H02P 5/69 | 180/65.285 |
| 8,583,358 B2* | 11/2013 | Kelly | B60T 7/22 | 303/121 |
| 8,589,014 B2* | 11/2013 | Fairfield | G05D 1/024 | 701/28 |
| 8,589,062 B2* | 11/2013 | Kelly | G01M 17/0078 | 434/305 |
| 8,670,891 B1* | 3/2014 | Szybalski | B62D 1/286 | 701/23 |
| 8,742,325 B1* | 6/2014 | Droz | G01J 1/0448 | 250/239 |
| 8,755,837 B2 | 6/2014 | Rhoads et al. | | |
| 8,767,190 B2 | 7/2014 | Hall | | |
| 8,788,446 B2* | 7/2014 | Yao | G06N 3/0436 | 700/28 |
| 8,825,259 B1* | 9/2014 | Ferguson | G05D 1/0214 | 104/124 |
| 8,836,922 B1* | 9/2014 | Pennecot | G01S 17/89 | 356/28 |
| 8,880,272 B1* | 11/2014 | Ferguson | G05D 1/0212 | 701/23 |
| 8,886,382 B2 | 11/2014 | Nettleton et al. | | |
| 8,892,496 B2* | 11/2014 | Yao | G06N 3/0436 | 706/45 |
| 8,909,428 B1* | 12/2014 | Lombrozo | B62D 15/025 | 701/41 |
| 8,930,128 B2* | 1/2015 | Kim | B60K 6/00 | 701/301 |
| 8,965,578 B2* | 2/2015 | Versteeg | G06N 3/004 | 700/258 |
| 8,977,007 B1* | 3/2015 | Ferguson | G06K 9/00825 | 340/988 |
| 8,996,224 B1* | 3/2015 | Herbach | G05D 1/0011 | 180/116 |
| 9,008,890 B1* | 4/2015 | Herbach | B60W 30/00 | 701/26 |
| 9,031,729 B2* | 5/2015 | Lathrop | B60W 50/10 | 701/23 |
| 9,046,371 B2 | 6/2015 | Casson et al. | | |
| 9,086,273 B1* | 7/2015 | Gruver | G01C 3/02 | |
| 9,139,199 B2 | 9/2015 | Harvey | | |
| 9,146,553 B2 | 9/2015 | Nettleton et al. | | |
| D743,978 S* | 11/2015 | Amin | D14/486 | |
| 9,182,942 B2* | 11/2015 | Kelly | G06F 7/00 | |
| 9,188,985 B1* | 11/2015 | Hobbs | G01C 21/34 | |
| 9,194,168 B1* | 11/2015 | Lu | E05F 15/70 | |
| 9,201,426 B1* | 12/2015 | Bonawitz | G05D 1/104 | |
| 9,213,934 B1 | 12/2015 | Versteeg et al. | | |
| 9,285,464 B2 | 3/2016 | Pennecot et al. | | |
| 9,290,201 B1 | 3/2016 | Lombrozo | | |
| 9,297,256 B2 | 3/2016 | Nettleton et al. | | |
| 9,315,212 B1* | 4/2016 | Kyrtsos | G05D 1/0088 | |
| 9,317,033 B2* | 4/2016 | Ibanez-Guzman | G05D 1/0027 | |
| 9,347,779 B1* | 5/2016 | Lynch | G01C 21/26 | |
| 9,367,065 B2 | 6/2016 | Dolgov et al. | | |
| 9,368,026 B1* | 6/2016 | Herbach | G08G 1/00 | |
| 9,368,936 B1* | 6/2016 | Lenius | G01S 17/32 | |
| 9,298,186 B2 | 7/2016 | Harvey | | |
| 9,382,797 B2 | 7/2016 | Nettleton et al. | | |
| 9,384,443 B2* | 7/2016 | Passot | G06N 3/008 | |
| 9,384,666 B1 | 7/2016 | Harvey | | |
| 9,395,727 B1* | 7/2016 | Smith | G05D 1/0257 | |
| 9,396,441 B1* | 7/2016 | Rubin | G06N 5/025 | |
| 9,441,971 B2 | 9/2016 | Casson et al. | | |
| 9,459,622 B2 | 10/2016 | Abhyanker | | |
| 9,476,303 B2 | 10/2016 | Nettleton et al. | | |
| 9,494,439 B1* | 11/2016 | Ross | B60W 50/029 | |
| 9,494,940 B1* | 11/2016 | Kentley | B60N 2/002 | |
| 9,494,943 B2 | 11/2016 | Harvey | | |
| 9,506,763 B2 | 11/2016 | Averbuch et al. | | |
| 9,507,346 B1* | 11/2016 | Levinson | G05D 1/0214 | |
| 9,517,767 B1 | 12/2016 | Kentley et al. | | |
| 9,522,699 B2 | 12/2016 | Raad et al. | | |
| 9,533,640 B2 | 1/2017 | Rai | | |
| 9,547,307 B1 | 1/2017 | Cullinane et al. | | |
| 9,606,539 B1* | 3/2017 | Kentley | G05D 1/0214 | |
| 9,612,123 B1* | 4/2017 | Levinson | G01C 21/32 | |
| 9,613,274 B2* | 4/2017 | Stevens | G06K 9/00664 | |
| 9,630,619 B1* | 4/2017 | Kentley | B60W 30/09 | |
| 9,632,502 B1* | 4/2017 | Levinson | G05D 1/0027 | |
| 9,701,239 B2 | 7/2017 | Kentley et al. | | |
| 2001/0029425 A1* | 10/2001 | Myr | G01C 21/3492 | 701/117 |
| 2002/0131608 A1* | 9/2002 | Lobb | H04R 1/403 | 381/111 |
| 2002/0140924 A1* | 10/2002 | Wangler | G01S 7/4802 | 356/28 |
| 2003/0046021 A1* | 3/2003 | Lasky | G05D 1/0261 | 702/150 |
| 2004/0017073 A1* | 1/2004 | Pavlov | B60N 2/002 | 280/806 |
| 2004/0068354 A1* | 4/2004 | Tabe | B60R 22/48 | 701/45 |
| 2004/0168837 A1* | 9/2004 | Michaud | B25J 5/005 | 180/9.46 |
| 2004/0193374 A1* | 9/2004 | Hac | B60K 31/0008 | 701/301 |
| 2004/0250614 A1* | 12/2004 | Ander | G01V 7/00 | 73/152.05 |
| 2004/0264207 A1* | 12/2004 | Jones | B60Q 1/326 | 362/500 |
| 2005/0046584 A1* | 3/2005 | Breed | B60C 11/24 | 340/13.31 |
| 2005/0107955 A1* | 5/2005 | Isaji | B60R 21/0134 | 701/301 |
| 2005/0216181 A1* | 9/2005 | Estkowski | G01C 21/20 | 701/411 |
| 2006/0030987 A1* | 2/2006 | Akita | B62D 15/025 | 701/41 |
| 2006/0064202 A1* | 3/2006 | Gutmann | G05D 1/0221 | 700/245 |
| 2006/0070432 A1* | 4/2006 | Ander | G01V 7/00 | 73/152.05 |
| 2006/0089763 A1* | 4/2006 | Barrett | G05D 1/0061 | 701/23 |
| 2006/0175116 A1* | 8/2006 | Friedman | B60K 28/14 | 180/282 |
| 2006/0207820 A1* | 9/2006 | Joshi | B60R 21/0134 | 180/271 |
| 2006/0208169 A1* | 9/2006 | Breed | B60N 2/002 | 250/221 |
| 2007/0096447 A1* | 5/2007 | Tabe | B60R 21/017 | 280/735 |
| 2007/0246927 A1* | 10/2007 | Okada | B60R 22/00 | 280/804 |
| 2007/0291130 A1 | 12/2007 | Broggi et al. | | |
| 2008/0033645 A1* | 2/2008 | Levinson | G01C 15/00 | 701/469 |
| 2008/0084283 A1* | 4/2008 | Kalik | B60Q 9/00 | 340/435 |
| 2008/0097699 A1* | 4/2008 | Ono | B60R 21/0134 | 701/300 |
| 2008/0161987 A1* | 7/2008 | Breed | G08G 1/161 | 701/27 |
| 2008/0309468 A1* | 12/2008 | Greene | G08G 1/165 | 340/436 |
| 2008/0316463 A1* | 12/2008 | Okada | G01S 7/4812 | 356/4.01 |
| 2008/0320421 A1* | 12/2008 | Demaris | G06F 17/5081 | 716/136 |

(56) References Cited

U.S. PATENT DOCUMENTS

| | | | |
|---|---|---|---|
| 2009/0029826 A1* | 1/2009 | Eguchi | B60T 7/02 477/39 |
| 2009/0036090 A1* | 2/2009 | Cho, II | G08G 1/092 455/345 |
| 2009/0208109 A1* | 8/2009 | Kakinami | B60Q 9/004 382/190 |
| 2009/0240647 A1* | 9/2009 | Green | G06N 7/005 706/52 |
| 2009/0276149 A1* | 11/2009 | Kauffman | G08G 5/0008 701/120 |
| 2010/0045482 A1* | 2/2010 | Strauss | G08G 1/163 340/903 |
| 2010/0106356 A1* | 4/2010 | Trepagnier | G01S 17/023 701/25 |
| 2010/0220141 A1* | 9/2010 | Ozawa | B41J 3/28 347/18 |
| 2010/0235129 A1* | 9/2010 | Sharma | G01S 7/4972 702/97 |
| 2010/0274449 A1* | 10/2010 | Yonak | B60R 21/0134 701/45 |
| 2010/0275829 A1* | 11/2010 | Sporsheim | B63B 39/03 114/125 |
| 2010/0292544 A1* | 11/2010 | Sherman | A61M 16/024 600/300 |
| 2010/0302528 A1* | 12/2010 | Hall | G01C 1/04 356/5.01 |
| 2011/0029235 A1* | 2/2011 | Berry | G01C 21/005 701/408 |
| 2011/0122729 A1* | 5/2011 | Hu | G01S 7/52004 367/98 |
| 2011/0130111 A1* | 6/2011 | Crandall | B60R 21/013 455/404.1 |
| 2011/0199199 A1* | 8/2011 | Perkins | B60Q 1/506 340/435 |
| 2011/0216304 A1* | 9/2011 | Hall | G01S 7/4813 356/4.01 |
| 2011/0241862 A1* | 10/2011 | Debouk | B60W 50/035 340/439 |
| 2011/0255070 A1* | 10/2011 | Phillips | G01S 7/4813 356/4.01 |
| 2011/0288684 A1* | 11/2011 | Farlow | B25J 11/009 700/264 |
| 2012/0035846 A1* | 2/2012 | Sakamoto | B60T 8/17558 701/301 |
| 2012/0044043 A1* | 2/2012 | Nettleton | E21C 41/26 340/3.7 |
| 2012/0046818 A1* | 2/2012 | Nettleton | E21F 17/00 701/23 |
| 2012/0046927 A1* | 2/2012 | Nettleton | E02F 9/205 703/6 |
| 2012/0046983 A1* | 2/2012 | Nettleton | G06Q 10/0631 705/7.12 |
| 2012/0053703 A1* | 3/2012 | Nettleton | E21C 41/26 700/9 |
| 2012/0053775 A1* | 3/2012 | Nettleton | E21C 41/26 701/24 |
| 2012/0083960 A1* | 4/2012 | Zhu | G05D 1/0055 701/23 |
| 2012/0136561 A1* | 5/2012 | Barker | G08G 1/0104 701/118 |
| 2012/0163670 A1* | 6/2012 | Eaton | G06K 9/00771 382/103 |
| 2012/0193153 A1* | 8/2012 | Wellborn | B62D 59/04 180/14.2 |
| 2012/0226391 A1* | 9/2012 | Fryer | G08G 1/202 701/1 |
| 2012/0256448 A1* | 10/2012 | Yasui | B62D 21/152 296/209 |
| 2012/0310465 A1* | 12/2012 | Boatright | B60Q 1/346 701/25 |
| 2013/0006451 A1* | 1/2013 | Cooper | B61L 3/006 701/19 |
| 2013/0046421 A1* | 2/2013 | El Fassi | B61L 3/127 701/2 |
| 2013/0054133 A1* | 2/2013 | Lewis | G01C 21/3407 701/423 |
| 2013/0060412 A1* | 3/2013 | Nakagawara | B60T 1/005 701/22 |
| 2013/0131908 A1 | 5/2013 | Trepagnier et al. | |
| 2013/0144476 A1* | 6/2013 | Pinto | B60T 8/17555 701/22 |
| 2013/0245877 A1* | 9/2013 | Ferguson | B60R 1/00 701/23 |
| 2013/0246301 A1* | 9/2013 | Radhakrishnan | G06Q 30/0282 705/347 |
| 2013/0268138 A1* | 10/2013 | Moughler | G05D 1/0214 701/2 |
| 2013/0273968 A1* | 10/2013 | Rhoads | G06F 17/30244 455/556.1 |
| 2013/0274986 A1 | 10/2013 | Trepagnier et al. | |
| 2013/0343071 A1* | 12/2013 | Nagaoka | B60Q 9/008 362/466 |
| 2014/0032012 A1* | 1/2014 | Joshi | G01S 13/865 701/1 |
| 2014/0032049 A1* | 1/2014 | Moshchuk | B62D 15/0265 701/42 |
| 2014/0088855 A1* | 3/2014 | Ferguson | G08G 1/166 701/117 |
| 2014/0129135 A1* | 5/2014 | Holden | G01C 21/30 701/420 |
| 2014/0129302 A1* | 5/2014 | Amin | G06Q 50/30 705/13 |
| 2014/0129951 A1* | 5/2014 | Amin | G06Q 50/30 715/738 |
| 2014/0132407 A1* | 5/2014 | Kumai | G08G 1/0962 340/439 |
| 2014/0142830 A1* | 5/2014 | Bernzen | G08G 1/16 701/70 |
| 2014/0185880 A1* | 7/2014 | Fairfield | G06K 9/00825 382/104 |
| 2014/0188343 A1* | 7/2014 | Yoshimura | B60K 6/46 701/41 |
| 2014/0188347 A1* | 7/2014 | Tabe | B60R 21/01516 701/45 |
| 2014/0210646 A1* | 7/2014 | Subramanya | B61L 29/28 340/928 |
| 2014/0214255 A1* | 7/2014 | Dolgov | G05D 1/0248 701/23 |
| 2014/0214260 A1* | 7/2014 | Eckert | B60Q 1/488 701/28 |
| 2014/0218527 A1* | 8/2014 | Subramanya | G08G 1/143 348/148 |
| 2014/0244151 A1* | 8/2014 | Matsubara | G08G 1/165 701/301 |
| 2014/0257661 A1* | 9/2014 | Schulman | B60R 22/48 701/70 |
| 2014/0297182 A1* | 10/2014 | Casson | G01C 21/00 701/537 |
| 2014/0303827 A1* | 10/2014 | Dolgov | B60W 30/00 701/23 |
| 2014/0309833 A1* | 10/2014 | Ferguson | G05D 1/00 701/23 |
| 2014/0333468 A1* | 11/2014 | Zhu | G01S 17/95 342/54 |
| 2014/0336935 A1* | 11/2014 | Zhu | G01W 1/00 702/3 |
| 2014/0343750 A1* | 11/2014 | Minemura | B60W 50/04 701/1 |
| 2014/0350790 A1* | 11/2014 | Akesson | G08G 1/167 701/41 |
| 2014/0358353 A1* | 12/2014 | Ibanez-Guzman | G05D 1/0027 701/23 |
| 2014/0358427 A1* | 12/2014 | Fuhrman | G01C 21/3602 701/452 |
| 2014/0365228 A1* | 12/2014 | Ng-Thow-Hing | G02B 27/01 704/275 |

(56) References Cited

U.S. PATENT DOCUMENTS

| | | | |
|---|---|---|---|
| 2014/0370911 A1* | 12/2014 | Gorgenyi | H04W 52/0251 455/456.1 |
| 2015/0006005 A1* | 1/2015 | Yu | G06Q 10/08 701/22 |
| 2015/0012166 A1* | 1/2015 | Hauler | G05D 1/0212 701/23 |
| 2015/0025708 A1* | 1/2015 | Anderson | A61B 5/6804 701/2 |
| 2015/0039157 A1* | 2/2015 | Wolfe | G06F 17/00 701/2 |
| 2015/0039167 A1* | 2/2015 | Ideshio | B60W 20/14 701/22 |
| 2015/0039391 A1* | 2/2015 | Hershkovitz | G06Q 10/04 705/7.31 |
| 2015/0057871 A1* | 2/2015 | Ono | G01C 21/34 701/23 |
| 2015/0091374 A1* | 4/2015 | Lenius | H02J 17/00 307/9.1 |
| 2015/0094850 A1* | 4/2015 | Passot | B25J 9/163 700/245 |
| 2015/0127224 A1* | 5/2015 | Tabe | B60R 22/48 701/45 |
| 2015/0127239 A1* | 5/2015 | Breed | B60R 21/0132 701/70 |
| 2015/0131080 A1* | 5/2015 | Retterath | G01S 17/10 356/5.01 |
| 2015/0149019 A1* | 5/2015 | Pilutti | G08G 1/22 701/23 |
| 2015/0149022 A1* | 5/2015 | Harvey | E04H 6/422 701/23 |
| 2015/0149088 A1* | 5/2015 | Attard | G01C 21/36 701/538 |
| 2015/0154545 A1 | 6/2015 | Skaaksrud et al. | |
| 2015/0154546 A1 | 6/2015 | Skaaksrud et al. | |
| 2015/0154554 A1 | 6/2015 | Skaaksrud | |
| 2015/0154585 A1 | 6/2015 | Skaaksrud | |
| 2015/0156253 A1 | 6/2015 | Skaaksrud et al. | |
| 2015/0156254 A1 | 6/2015 | Skaaksrud | |
| 2015/0156718 A1* | 6/2015 | Skaaksrud | H04W 12/06 370/311 |
| 2015/0160024 A1* | 6/2015 | Fowe | G01C 21/34 701/400 |
| 2015/0178998 A1* | 6/2015 | Attard | G07C 5/008 701/23 |
| 2015/0185034 A1* | 7/2015 | Abhyanker | G01C 21/36 701/23 |
| 2015/0198445 A1 | 7/2015 | Casson et al. | |
| 2015/0234387 A1* | 8/2015 | Mullan | G05D 1/104 701/3 |
| 2015/0248131 A1* | 9/2015 | Fairfield | G05D 1/0044 701/2 |
| 2015/0248689 A1* | 9/2015 | Paul | G06Q 30/0222 705/14.23 |
| 2015/0254986 A1* | 9/2015 | Fairfield | G08G 1/22 707/687 |
| 2015/0258928 A1* | 9/2015 | Goto | B60Q 1/085 701/49 |
| 2015/0266488 A1* | 9/2015 | Solyom | B60W 50/0205 701/28 |
| 2015/0268665 A1* | 9/2015 | Ludwick | B60Q 5/008 701/23 |
| 2015/0271290 A1* | 9/2015 | Tao | H04L 41/5051 709/217 |
| 2015/0285645 A1* | 10/2015 | Maise | B62D 15/0285 701/25 |
| 2015/0292894 A1* | 10/2015 | Goddard | G01C 21/3453 701/400 |
| 2015/0293228 A1* | 10/2015 | Retterath | G01S 17/89 356/5.01 |
| 2015/0298636 A1* | 10/2015 | Furst | B60R 21/0132 701/45 |
| 2015/0321606 A1* | 11/2015 | Vartanian | G02B 27/0101 348/148 |
| 2015/0331422 A1* | 11/2015 | Hartung | G05D 1/021 701/23 |
| 2015/0336502 A1* | 11/2015 | Hillis | B60Q 1/26 701/23 |
| 2015/0336524 A1* | 11/2015 | Larner | B60R 11/04 293/120 |
| 2015/0338226 A1* | 11/2015 | Mason | G01C 21/3605 701/408 |
| 2015/0338852 A1* | 11/2015 | Ramanujam | G01C 21/26 701/2 |
| 2015/0339928 A1* | 11/2015 | Ramanujam | G08G 1/202 701/23 |
| 2015/0346727 A1* | 12/2015 | Ramanujam | B62D 15/0285 701/23 |
| 2015/0348221 A1* | 12/2015 | Pedersen | G06Q 50/30 705/7.38 |
| 2015/0356368 A1* | 12/2015 | Liu | G06K 9/46 382/203 |
| 2015/0359032 A1* | 12/2015 | Menard | H04L 1/08 701/2 |
| 2015/0370251 A1* | 12/2015 | Siegel | G05D 1/0027 701/2 |
| 2015/0370255 A1* | 12/2015 | Harvey | B62D 15/0285 701/24 |
| 2015/0375764 A1* | 12/2015 | Rajendran | B61L 15/0027 701/2 |
| 2016/0009291 A1* | 1/2016 | Pallett | B60W 50/082 701/23 |
| 2016/0016312 A1* | 1/2016 | Lawrence, III | G01B 11/24 700/98 |
| 2016/0016315 A1* | 1/2016 | Kuffner, Jr. | B25J 9/1676 700/255 |
| 2016/0033963 A1* | 2/2016 | Noh | H04W 4/046 701/2 |
| 2016/0047901 A1* | 2/2016 | Pacala | G01S 7/4815 356/5.01 |
| 2016/0071278 A1* | 3/2016 | Leonard | G06T 7/0071 348/47 |
| 2016/0071418 A1* | 3/2016 | Oshida | G08G 1/22 701/23 |
| 2016/0101811 A1* | 4/2016 | Kyrtsos | B62D 13/06 701/25 |
| 2016/0107509 A1* | 4/2016 | Kirsch | B60H 1/00742 165/202 |
| 2016/0107703 A1* | 4/2016 | Briceno | B62D 25/082 296/187.1 |
| 2016/0129787 A1* | 5/2016 | Netzer | B60K 35/00 701/36 |
| 2016/0159402 A1* | 6/2016 | Nakaya | B62D 25/20 296/193.02 |
| 2016/0159407 A1* | 6/2016 | Holmstrom | B62D 27/023 296/187.1 |
| 2016/0167608 A1* | 6/2016 | Rai | B60W 10/30 701/36 |
| 2016/0169683 A1 | 6/2016 | Lynch | |
| 2016/0171521 A1* | 6/2016 | Ramirez | G06Q 30/0224 701/409 |
| 2016/0171637 A1* | 6/2016 | Rai | H04L 67/12 705/13 |
| 2016/0171894 A1* | 6/2016 | Harvey | G05D 1/0088 701/23 |
| 2016/0178381 A1* | 6/2016 | Lynch | G01C 21/30 701/23 |
| 2016/0187150 A1* | 6/2016 | Sherman | G01C 21/3438 705/7.15 |
| 2016/0189544 A1* | 6/2016 | Ricci | G07C 5/008 701/117 |
| 2016/0207454 A1* | 7/2016 | Cuddihy | B60Q 9/00 |
| 2016/0209220 A1* | 7/2016 | Laetz | G06Q 10/02 |
| 2016/0221186 A1* | 8/2016 | Perrone | B25J 9/1661 |
| 2016/0223343 A1* | 8/2016 | Averbuch | B60W 50/14 |
| 2016/0224028 A1 | 8/2016 | Harvey | |
| 2016/0229451 A1* | 8/2016 | Raad | B62D 13/06 |
| 2016/0247106 A1* | 8/2016 | Dalloro | G06Q 10/06313 |

(56) References Cited

U.S. PATENT DOCUMENTS

| | | | |
|---|---|---|---|
| 2016/0247109 A1* | 8/2016 | Scicluna | G06Q 10/06315 |
| 2016/0247394 A1* | 8/2016 | Stenneth | G08G 1/0112 |
| 2016/0251016 A1 | 9/2016 | Pallett et al. | |
| 2016/0265930 A1* | 9/2016 | Thakur | G05D 1/0088 |
| 2016/0266581 A1 | 9/2016 | Dolgov et al. | |
| 2016/0274590 A1 | 9/2016 | Harvey | |
| 2016/0280258 A1* | 9/2016 | Lavoie | B62D 6/10 |
| 2016/0280267 A1* | 9/2016 | Lavoie | B62D 15/0285 |
| 2016/0334797 A1* | 11/2016 | Ross | G05D 1/0027 |
| 2016/0347329 A1* | 12/2016 | Zelman | B60W 50/16 |
| 2016/0355092 A1* | 12/2016 | Higuchi | B62D 21/02 |
| 2016/0362045 A1* | 12/2016 | Vegt | H04W 4/00 |
| 2016/0368492 A1* | 12/2016 | Al-Stouhi | B60W 30/18154 |
| 2016/0370194 A1* | 12/2016 | Colijn | G01C 21/343 |
| 2016/0371979 A1 | 12/2016 | Casson et al. | |
| 2017/0028966 A1* | 2/2017 | Elie | B60R 25/045 |
| 2017/0030127 A1* | 2/2017 | Elie | E05F 15/42 |
| 2017/0030128 A1* | 2/2017 | Elie | E05F 15/42 |
| 2017/0030134 A1* | 2/2017 | Elie | E05F 15/71 |
| 2017/0030135 A1* | 2/2017 | Elie | E05F 15/41 |
| 2017/0030737 A1* | 2/2017 | Elie | E05F 15/70 |
| 2017/0032599 A1* | 2/2017 | Elie | G06F 3/005 |
| 2017/0060234 A1* | 3/2017 | Sung | B60R 1/006 |
| 2017/0067747 A1* | 3/2017 | Ricci | H04W 4/21 |
| 2017/0075358 A1* | 3/2017 | Zhang | G06Q 10/06 |
| 2017/0120753 A1* | 5/2017 | Kentley | G05D 1/0077 |
| 2017/0120803 A1* | 5/2017 | Kentley | B60Q 1/26 |
| 2017/0120804 A1* | 5/2017 | Kentley | G05D 1/0088 |
| 2017/0120814 A1* | 5/2017 | Kentley | B60Q 9/008 |
| 2017/0120902 A1* | 5/2017 | Kentley | B60W 10/04 |
| 2017/0120904 A1 | 5/2017 | Kentley et al. | |
| 2017/0123419 A1 | 5/2017 | Levinson et al. | |
| 2017/0123421 A1* | 5/2017 | Kentley | G01C 21/26 |
| 2017/0123422 A1* | 5/2017 | Kentley | B60H 1/00735 |
| 2017/0123428 A1* | 5/2017 | Levinson | G05D 1/0214 |
| 2017/0123429 A1* | 5/2017 | Levinson | G05D 1/0088 |
| 2017/0124476 A1* | 5/2017 | Levinson | G05D 1/0088 |
| 2017/0124781 A1* | 5/2017 | Douillard | B60Q 1/26 |
| 2017/0126810 A1* | 5/2017 | Kentley | H04L 67/125 |
| 2017/0132334 A1* | 5/2017 | Levinson | G06F 17/5009 |
| 2017/0132934 A1* | 5/2017 | Kentley | G08G 1/202 |

FOREIGN PATENT DOCUMENTS

| | | |
|---|---|---|
| EP | 2549456 | 1/2013 |
| EP | 2626760 | 8/2013 |
| GB | 2460916 | 12/2009 |
| GB | 2520493 | 5/2015 |
| JP | 2011248855 | 12/2011 |
| RU | 2269813 | 2/2006 |
| RU | 103114 | 3/2011 |
| RU | 140935 | 5/2014 |
| WO | WO1993007016 | 4/1993 |
| WO | WO2003073123 | 9/2003 |
| WO | WO2009151781 | 12/2009 |
| WO | WO2011098848 | 8/2011 |
| WO | WO2011154681 | 12/2011 |
| WO | WO2012172526 | 12/2012 |
| WO | WO2013087527 | 6/2013 |
| WO | WO2014021961 | 2/2014 |
| WO | WO2014129944 | 8/2014 |
| WO | WO2015026471 | 2/2015 |
| WO | WO2015099679 | 7/2015 |
| WO | WO2015134152 | 9/2015 |
| WO | WO2015155133 | 10/2015 |
| WO | WO2015197826 | 12/2015 |
| WO | WO 2016/172251 | 10/2016 |
| WO | WO2014079222 | 5/2017 |
| WO | WO2017079219 | 5/2017 |
| WO | WO2017079228 | 5/2017 |
| WO | WO2017079229 | 5/2017 |
| WO | WO2017079289 | 5/2017 |
| WO | WO2017079290 | 5/2017 |
| WO | WO2017079301 | 5/2017 |
| WO | WO2017079304 | 5/2017 |
| WO | WO2017079311 | 5/2017 |
| WO | WO2017079321 | 5/2017 |
| WO | WO2017079332 | 5/2017 |
| WO | WO2017079341 | 5/2017 |
| WO | WO2017079349 | 5/2017 |
| WO | WO2017079460 | 5/2017 |
| WO | WO2017079474 | 5/2017 |

OTHER PUBLICATIONS

Group Induction; Teichman, Alex, Thrun, Sebastian, Proc. of the IEEE/RSJ Intl Conf on Intelligent Robotics and Systems (IROS) (2013).

Automatic Online Calibration of Cameras and Lasers; Levinson, Jesse, Thrun, Sebastian; Robotics: Science and Systems (RSS) (2013).

Precision Tracking With Sparse 3D and Dense Color 2D Data; Held, David, Levinson, Jesse, Thrun, Sebastian; International Conference on Robotics and Automation (ICRA) (2013).

Online Slam With Any-Time Self-Calibration and Automatic Change Detection; Nima Keivan and Gabe Sibley; IEEE International Conference on Robotics and Automation (ICRA) (2014).

Online, Semi-Supervised Learning for Long-Term Interaction With Object Recognition Systems; Teichman, Alex, Thrun, Sebastian; RSS Workshop on Long-Term Operation of Autonomous Robotic Systems in Changing Environments (2012).

Tracking-Based Semi-Supervised Learning; Teichman, Alex, Thrun, Sebastian; International Journal of Robotics Research (IJRR); http://ijr.sagepub.com/content/31/7/804; (2012).

A Probabilistic Framework for Object Detection in Images Using Context and Scale; Held, David, Levinson, Jesse, Thrun, Sebastian; International Conference on Robotics and Automation (ICRA) (2012).

Practical Object Recognition in Autonomous Driving and Beyond; Teichman, Alex, Thrun, Sebastian, IEEE Workshop on Advanced Robotics and its Social Impacts (ARSO) (2011).

Tracking-Based Semi-Supervised Learning: Teichman, Alex, Thrun, Sebastian; Robotics: Science and Systems (RSS) (2011).

Towards 3D Object Recognition Via Classification of Arbitrary Object Tracks; Teichman, Alex, Levinson, Jesse, Thrun, Sebastian; International Conference on Robotics and Automation (ICRA) (2011).

Towards Fully Autonomous Driving: Systems and Algorithms; Levinson, Jesse et al.; Intelligent Vehicles Symposium (2011).

Traffic Light Mapping, Localization, and State Detection for Autonomous Vehicles; Levinson, Jesse, Askeland, Jake, Dolson, Jennifer, Thrun, Sebastian; International Conference on Robotics and Automization (ICRA) (2011).

Automatic Laser Calibration, Mapping, and Localization for Autonomous Vehicles; Levinson, Jesse; Thesis (Ph D); Stanford University (2011).

Unsupervised Calibration for Multi-Beam Lasers; Levinson, Jesse, Thrun, Sebastian, International Symposium on Experimental Robotics (ISER) (2010).

Robust Vehicle Localization in Urban Environments Using Probabilistic Maps; Levinson, Jesse, Thrun, Sebastian; International Conference on Robotics and Automation (ICRA) (2010).

Exponential Family Sparse Coding With Application to Self-Taught Learning; Honglak, Lee, Raina, Rajat, Teichman, Alex, Ng, Andrew Y.; International Joint Conference on Artificial Intelligence (IJCAI) (2009).

Map-Based Precision Vehicle Localization in Urban Environments; Levinson, Jesse, Thrun, Sebastian; Robotics: Science and Systems (RSS) (2007).

Stanford Autonomous Driving Team website http://driving.stanford.edu/papers/html; Various; Stanford University (2014).

Combining Data-Driven and Model-Based Cues for Segmentation of Video Sequences; Eckes, Christian, Vorbruggen, Jan C.; Proceedings WCNN '96, San Diego, USA (1996).

A Real-Time Motion Planner With Trajectory Optimization for Autonomous Vehicles; Xu, Wenda et al.; Robotics and Automation (ICRA); Saint Paul, MN, USA (2012).

Dynamic Real-Time Replanning in Belief Space: An Experimental

(56) References Cited

OTHER PUBLICATIONS

Study on Physical Mobile Robots; Agha-mohammadi, Ali-Akbar et al.; Technical Report TR 13-007; Texas A&M University, USA (2013).
An Evaluation of Dynamic Object Tracking With 3D Lidar; Morton P., Douillard, B., Underwood, J.; Proceedings of Australasian Conference on Robotics and Automation; Dec. 7-9, 2011; Melbourne, Australia (2011).
Control of Robotic Mobility-On Demand Systems: A Queuing-Theoretical Perspective; Zhang, Rick; Pavone, Marco; Intl Journal of Robotics Research, pp. 1-18, Stanford, USA (2015).
Evaluation of Urban Vehicle Routing Algorithms; Kong, Linghe et al.; Intl Journal of Digital Content Technology and its Applications (IDCTA); vol. 6, No. 23, University of New Mexico, USA (2012).
Real-Time High Resolution Fusion of Depth Maps on GPU; Trifonov, Dmitry; Intl Conference on Computer-Aided Design and Computer Graphics (CAD/Graphics); Guangzhou, China (2013).
Real-Time Image Segmentation on a GPU; Abramov, Alexey et al.; Facing the Multi-Core Challenge, pp. 131-142, Berlin, Germany (2010).
A Tutorial on Graph-Based Slam; Grisetti, Giorgio et al.; Intelligent Transportation Systems Magazine, IEEE; pp. 31-43 (2010).
Sensor Fusion and Calibration of Inertial Sensors, Vision, Ultra-Wideband and GPS; HOL, Jeroen; Linkoping Studies in Science and Technology, Dissertations No. 1368; Department of Electrical Engineering; Linkoping University, SE-581 83 Linkoping, Sweden (2011).
Large Scale Dense Visual Inertial Slam; Ma, Lu et al.; Field and Service Robotics (FSR) (2015).
Simultaneous Localization, Mapping, and Manipulation for Unsupervised Object Discovery; Ma, Lu et al.; IEEE International Conference on Robotics and Automation (ICRA) (2014).
Office Action for U.S. Appl. No. 14/932,940, dated May 4, 2016, Levinson et al., "Automated Extraction of Semantic Information to Enhance Incremental Mapping Modifications for Robotic Vehicles", 22 pages.
Office Action for U.S. Appl. No. 14/932,952, dated Jun. 24, 2016, Kentley et al., "Resilient Safety System for a Robotic Vehicle", 11 pages.
Easymile (website), Retrieved from <https://web.archive.org/web/20150723060050/http://easymile.com/> Jul. 2015, <https://web.archive.org/web/201508012054107/http://easymile.com/mobility-solution/>, Aug. 2015.
Office Action for U.S. Appl. No. 14/932,959, dated Aug. 5, 2016, Kentley et al., "Autonomous Vehicle Fleet Service and System", 16 pages.
Swarming Behavior Using Probabilistic Roadmap Techniques; Bayazit et al., Swarm Robotics WS 2004, LNCS, Springer-Verlag Berlin Heidelberg, pp. 112-125 (2005).
Office Action for U.S. Appl. No. 14/932,963, dated Aug. 15, 2016, Levinson et al., "Adaptive Mapping to Navigate Autonomous Vehicles Responsive to Physical Environment Changes", 15 pages.
Office Action for U.S. Appl. No. 14/756,992, dated Aug. 25, 2016, Levinson et al., "Adaptive Autonomous Vehicle Planner Logic", 9 pages.
Office Action for U.S. Appl. No. 14/933,469, dated Aug. 30, 2016, Kentley et al., "Software Application to Request and Control an Autonomous Vehicle Service", 11 pages.
Monocular Camera Trajectory Optimization Using Lidar Data, Bodensteiner et al., IEEE International Conference on Computer Vision Workshops, 2011, 8 pages.
Office Action for U.S. Appl. No. 14/932,962, dated Mar. 21, 2016, Kentley et al., "Robotic Vehicle Active Safety Systems and Methods", 18 pages.
Office Action for U.S. Appl. No. 14/932,963, dated Mar. 17, 2016, Levinson et al., "Adaptive Mapping to Navigate Autonomous Vehicles Responsive to Physical Environment Changes," 26 pages.
Toward Robotic Cars; Thrun, Sebastian; Communications of the ACM, vol. 53, No. 4, Apr. 2010.

Office Action for U.S. Appl. No. 14/933,602, dated Aug. 19, 2016, Levinson et al., "Machine-Learning Systems and Techniques to Optimize Teleoperation and/or Planner Decisions," 37 pages.
Notice of Allowance and Fee(s) Due for U.S. Appl. No. 14/933,602, dated Dec. 14, 2016, Levinson et al., "Machine-Learning Systems and Techniques to Optimize Teleoperation and/or Planner Decisions," 31 pages.
Corrected Notice of Allowability for U.S. Appl. No. 14/933,602, dated Jan. 13, 2017, Levinson et al., "Machine-Learning Systems and Techniques to Optimize Teleoperation and/or Planner Decisions," 2 pages.
Kuznetsov, S., International Search Report and the Written Opinion of the International Searching Authority for International Patent Application No. PCT/US2016/060384, dated May 4, 2017.
Office Action for U.S. Appl. No. 14/757,015, dated Mar. 27, 2017, Kentley, Timothy David, "Independent Steering, Power Torque Control and Transfer in Autonomous Vehicles," 58 pages.
Koutsorodis, Dafani, International Search Report and the Written Opinion of the International Searching Authority for International Patent Application No. PCT/US2016/060104, dated Feb. 2, 2017.
Sokolov, D., International Search Report and the Written Opinion of the International Searching Authority for International Patent Application No. PCT/US2016/060121, dated Mar. 30, 2017.
Office Action for U.S. Appl. No. 14/932,959, dated Mar. 16, 2016, Kentley et al., "Autonomous Vehicle Fleet Service and System," 33 pages.
Office Action for U.S. Appl. No. 14/932,959, dated Aug. 5, 2016, Kentley et al., "Autonomous Vehicle Fleet Service and System," 25 pages.
Office Action for U.S. Appl. No. 14/932,959, dated Dec. 2, 2016, Kentley et al., "Autonomous Vehicle Fleet Service and System," 53 pages.
Notice of Allowance and Fee(s) Due for U.S. Appl. No. 14/932,959, dated Feb. 10, 2017, Kentley et al., "Autonomous Vehicle Fleet Service and System," 36 pages.
Sokolov, D., International Search Report and the Written Opinion of the International Searching Authority for International Patent Application No. PCT/US2016/060021, dated Mar. 30, 2017.
Sokolov, D., International Search Report and the Written Opinion of the International Searching Authority for International Patent Application No. PCT/US2016/060030, dated Mar. 30, 2017.
Office Action for U.S. Appl. No. 14/932,963, dated Mar. 17, 2016, Levinson et al., "Adaptive Mapping to Navigate Autonomous Vehicles Responsive to Physical Environment Changes," 60 pages.
Office Action for U.S. Appl. No. 14/932,963, dated Aug. 15, 2016, Levinson et al., "Adaptive Mapping to Navigate Autonomous Vehicles Responsive to Physical Environment Changes," 44 pages.
Notice of Allowance and Fee(s) Due for U.S. Appl. No. 14/932,963, dated Feb. 15, 2017, Levinson et al., "Adaptive Mapping to Navigate Autonomous Vehicles Responsive to Physical Environment Changes," 50 pages.
Office Action for U.S. Appl. No. 14/932,962, dated Mar. 21, 2016, Kentley et al., "Robotic Vehicle Active Safety Systems and Methods," 47 pages.
Notice of Allowance and Fee(s) Due for U.S. Appl. No. 14/932,962, dated Jul. 26, 2016, Kentley et al., "Robotic Vehicle Active Safety Systems and Methods," 31 pages.
Notice of Allowability for U.S. Appl. No. 14/932,962, dated Aug. 23, 2016, Kentley et al., "Robotic Vehicle Active Safety Systems and Methods," 6 pages.
Collision Warning and Sensor Data Processing in Urban Areas, Mertz et al., The Robotics Institute, Carnegie Mellon University, School of Computer Science, Research Shocase @ CMU (Jun. 2005).
Notice of Allowance and Fee(s) Due for U.S. Appl. No. 14/932,962, dated Mar. 2, 2017, Kentley et al., "Robotic Vehicle Active Safety Systems and Methods," 58 pages.
Corrected Notice of Allowability for U.S. Appl. No. 14/932,962, dated Mar. 9, 2017, Kentley et al., "Robotic Vehicle Active Safety Systems and Methods," 5 pages.
ISA, Sabine, International Search Report and the Written Opinion of the International Searching Authority for International Patent Application No. PCT/US2016/060183, dated Mar. 30, 2017.

(56) References Cited

OTHER PUBLICATIONS

Office Action for U.S. Appl. No. 14/756,994, dated Jan. 26, 2017, Kentley et al., "System of Configuring Active Lighting to Indicate Directionality of An Autonomous Vehicle," 19 pages.
Notice of Allowance and Fee(s) Due for U.S. Appl. No. 14/756,994, dated Jun. 2, 2017, Kentley et al., "System of Configuring Active Lighting to Indicate Directionality of an Autonomous Vehicle," 9 pages.
Office Action for U.S. Appl. No. 14/756,991, dated Feb. 28, 2017, Levinson et al., "Sensor-Based Object-Detection Optimization for Autonomous Vehicles," 30 pages.
Efficient Power Conversion, "Why GaN circuits make better Lidar," retrieved on Jul. 18, 2017 at <<http://epc-co.com/epc/DesignSupport/TrainingVideos/eGaNDemos/GaN-circuits-make-better-LiDAR.aspx>>, 2 pages.
Kang, Sung Chul, International Search Report and Written Opinion of the International Searching Authority for International Patent Application No. PCT/US2014/047864, dated Nov. 19, 2014, 10 pages.
Notice of Allowance and Fee(s) Due for U.S. Appl. No. 14/462,075, dated Nov. 18, 2015, Pennecot et al., "Devices and Methods for a Rotating Lidar Platform With a Shared Transmit/Receive Path," 8 pages.
Office Action for U.S. Appl. No. 14/462,075, dated Jun. 17, 2015, Pennecot et al., "Devices and Methods for a Rotating Lidar Platform With a Shared Transmit/Receive Path," 14 pages.
Rim et al., "The Optical Advantages of Curved Focal Plane Arrays," Optics Express, vol. 16, No. 7, Mar. 31, 2008, 7 pages.
Xu et al., "A Calibration Method of the Multi-Channel Imaging Lidar," SPIE Proceedings, vol. 9080, Lasar Radar Technology and Applications XIX; and Atmpospheric Propagation XI, 90800V (Jun. 9, 2014), doi:10.1117/12.2049678, 2 pages.
Notice of Allowance and Fee(s) Due for U.S. Appl. No. 14/756,991, dated Jun. 20, 2017, Levinson et al., "Sensor-Based Object-Detection Optimization for Autonomous Vehicles," 8 pages.
Zadunaev, D., International Search Report and Written Opinion of the International Searching Authority for International Patent Application No. PCT/US2016/060183, dated Mar. 16, 2017, 8 pages.
Office Action for U.S. Appl. No. 14/756,992, dated Aug. 25, 2016, Levinson et al., "Adaptive Autonomous Vehicle Planner Logic," 11 pages.
Office Action for U.S. Appl. No. 14/756,992, dated Jan. 4, 2017, Levinson et al., "Adaptive Autonomous Vehicle Planner Logic," 13 pages.
Advisory Action for U.S. Appl. No. 14/756,992, dated Mar. 13, 2017, Levinson et al., "Adaptive Autonomous Vehicle Planner Logic," 3 pages.
Office Action for U.S. Appl. No. 14/756,992, dated Jun. 1, 2017, Levinson et al., "Adaptive Autonomous Vehicle Planner Logic," 14 pages.
Zamakhaev, K., International Search Report and Written Opinion of the International Searching Authority for International Patent Application No. PCT/US2016/060029, dated Apr. 27, 2017, 6 pages.
Office Action for U.S. Appl. No. 14/756,993, dated Jul. 19, 2017, Kentley et al., "Method for Robotic Vehicle Communication With an External Environment Via Acoustic Beam Forming," 25 pages.
Zamakhaev, K., International Search Report and Written Opinion of the International Searching Authority for International Patent Application No. PCT/US2016/060161, dated Jun. 8, 2017, 9 pages.
Office Action for U.S. Appl. No. 14/756,995, dated Oct. 31, 2016, Kentley et al., "Coordination of Dispatching and Maintaining Fleet of Autonomous Vehicles," 36 pages.
Office Action for U.S. Appl. No. 14/756,995, dated Apr. 5, 2017, Kentley et al., "Coordination of Dispatching and Maintaining Fleet of Autonomous Vehicles," 38 pages.
Zamakhaev, K., International Search Report and Written Opinion of the International Searching Authority for International Patent Application No. PCT/US2016/060105, dated Mar. 30, 2017, 7 pages.

Office Action for U.S. Appl. No. 14/756,996, dated May 4, 2017, Douillard et al., "Calibration for Autonomous Vehicle Operation," 5 pages.
Zamakhaev, K., International Search Report and Written Opinion of the International Searching Authority for International Patent Application No. PCT/US2016/060118, dated Mar. 30, 2017, 7 pages.
GPS Logger: Methods for Determining the Mileage of Vehicles, May 31, 2012, Retrieved from Internet on Jul. 21, 2017 at <<http://www.gpslogger.ru/odomter/>>.
Office Action for U.S. Appl. No. 14/932,940, dated May 4, 2016, Levinson et al., "Automated Extraction of Semantic Information to Enhance Incremental Mapping Modifications for Robotic Vehicles," 23 pages.
Office Action for U.S. Appl. No. 14/932,940, dated Nov. 22, 2016, Levinson et al., "Automated Extraction of Semantic Information to Enhance Incremental Mapping Modifications for Robotic Vehicles," 30 pages.
Notice of Allowance and Fee(s) Due for U.S. Appl. No. 14/932,940, dated Apr. 7, 2017, Levinson et al., "Automated Extraction of Semantic Information to Enhance Incremental Mapping Modifications for Robotic Vehicles," 8 pages.
Zamakhaev, K., International Search Report and Written Opinion of the International Searching Authority for International Patent Application No. PCT/US2016/060173, dated May 11, 2017, 7 pages.
Joaquin, Vano Gea, International Search Report and Written Opinion of the International Searching Authority for International Patent Application No. PCT/US2016/060018, dated Feb. 14, 2017, 12 pages.
Office Action for U.S. Appl. No. 14/932,948, dated Jul. 29, 2016, Kentley et al., "Active Lighting Control for Communicating a State of an Autonomous Vehicle to Entities in a Surrounding Environment," 6 pages.
Office Action for U.S. Appl. No. 14/932,948, dated Oct. 14, 2016, Kentley et al., "Active Lighting Control for Communicating a State of an Autonomous Vehicle to Entities in a Surrounding Environment," 16 pages.
Office Action for U.S. Appl. No. 14/932,948, dated Mar. 21, 2017, Kentley et al., "Active Lighting Control for Communicating a State of an Autonomous Vehicle to Entities in a Surrounding Environment," 20 pages.
Office Action for U.S. Appl. No. 14/932,952, dated Jun. 24, 2016, Kentley et al., "Resilient Safety System for a Robotic Vehicle," 12 pages.
Office Action for U.S. Appl. No. 14/932,952, dated Jan. 10, 2017, Kentley et al., "Resilient Safety System for a Robotic Vehicle," 18 pages.
Komarchuk, A., International Search Report and Written Opinion of the International Searching Authority for International Patent Application No. PCT/US2016/060130, dated Apr. 6, 2017, 9 pages.
Office Action for U.S. Appl. No. 14/933,469, dated Aug. 30, 2016, Kentley et al., "Software Application to Request and Control Autonomous Vehicle Service," 12 pages.
Office Action for U.S. Appl. No. 14/933,469, dated Jan. 5, 2017, Kentley et al., "Software Application to Request and Control Autonomous Vehicle Service," 12 pages.
Advisory Action for U.S. Appl. No. 14/933,469, dated Mar. 17, 2017, Kentley et al., "Software Application to Request and Control Autonomous Vehicle Service," 3 pages.
Zamakhaev, K., International Search Report and Written Opinion of the International Searching Authority for International Patent Application No. PCT/US2016/060368, dated Apr. 27, 2017, 11 pages.
Office Action for U.S. Appl. No. 14/933,469, dated Jun. 22, 2017, Kentley et al., "Software Application to Request and Control Autonomous Vehicle Service," 8 pages.
Office Action for U.S. Appl. No. 14/933,706, dated Feb. 14, 2017, Kentley et al., "Interactive Autonomous Vehicle Command Controller," 9 pages.
Office Action for U.S. Appl. No. 14/933,706, dated Jun. 5, 2017, Kentley et al., "Interactive Autonomous Vehicle Command Controller," 20 pages.
Programmer's Guide, ChargePoint Web Services API Version 4.1, Document Part No. 75-001102-01, Revision 4, May 16, 2014,

(56) References Cited

OTHER PUBLICATIONS

Retrieved on the Internet at <https://na.chargepoint.com/UI/downloads/en/ChargePoint_Web_Services_API_Guide_Ver4.1_Rev4.pdf>.
International Search Report and Written Opinion for International (PCT) Patent Application No. PCT/US2018/017151, dated May 14, 2018 9 pages.

* cited by examiner

NAVIGATION OF AUTONOMOUS VEHICLES TO ENHANCE SAFETY UNDER ONE OR MORE FAULT CONDITIONS

FIELD

Various embodiments relate generally to autonomous vehicles and associated mechanical, electrical and electronic hardware, computing software, including autonomy applications, image processing applications, etc., computing systems, and wired and wireless network communications to facilitate autonomous control of vehicles, and, more specifically, to systems, devices, and methods configured to navigate autonomous vehicles under one or more fault conditions.

BACKGROUND

A variety of approaches to developing driverless vehicles and automating conventional vehicles (e.g., manually-driven automotive vehicles) are principally directed to autonomous driving based on sensor data, such as image data or radar. In some approaches, a conventional autonomous vehicle typically requires a human driver to assume control (e.g., braking, steering, etc.) during situations for which computational processing may be ill-suited to ensure the safety of the vehicle or occupants.

Although functional, conventional autonomous vehicles and their safety mechanisms and protocols suffer a number of drawbacks. For example, when an autonomous vehicle fails to sense external environments or compute trajectories over which to drive, the autonomous vehicle usually alerts a human driver to engage the controls of the vehicle to drive out from fault or hazardous conditions. Other drawbacks are also present in a variety of known approaches to implementing safety devices in traditional autonomous vehicles.

Thus, what is needed is a solution for implementing autonomous safety control functions in autonomous vehicles, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
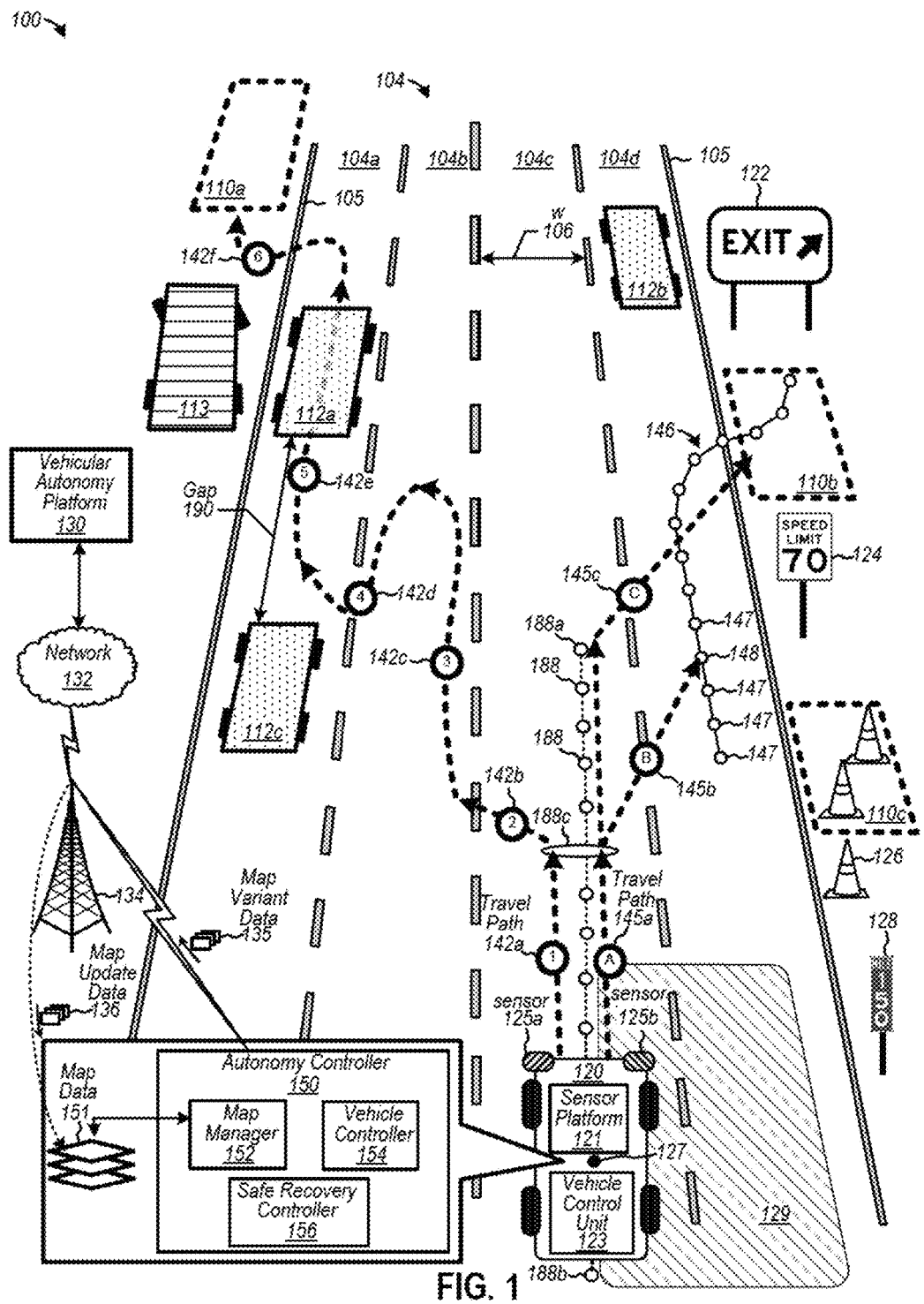
FIG. 1 is a diagram depicting an example of a safe recovery controller, according to some embodiments.

FIG. 1 is a diagram depicting an example of a safe recovery controller, according to some embodiments. Diagram 100 depicts an example of a safe recovery controller 156 configured to detect an anomalous event, such as a sensor fault or failure, and to navigate an autonomous vehicle 120 to safety. For example, safe recovery controller 156 may be configured to guide autonomous vehicle 120 from a path of travel ("travel path") 142a or 145a to a recovery path over which autonomous vehicle 120 may be guided to one or more safe zones, 110a, 110b, and 110c. In some examples, safe recovery controller 156 may repeatedly perform computations, prior to detecting an anomalous event, to form alternate particular drive parameters. Upon detecting an anomalous event, safe recovery controller 156 may replace drive parameters used to propel autonomous vehicle 120 along a path of travel 142a, 145a with alternate drive parameters to redirect it from a potentially dangerous situation to a safe zone. A safe zone may refer to a space or an area on, or adjacent to, a roadway 104 over which autonomous vehicle 120 may be traveling, according to some examples. In some cases, a safe zone may include a region free from obstacles that may enable autonomous vehicle 120 to avoid traffic hazards by exiting roadway 104. Diagram 100 depicts autonomous vehicle 120 propelling over roadway 104 in a lane 104c, which is one of four lanes 104a, 104b, 104c, and 104d. Normatively, lane 104a is used for faster rates of travel, whereas lane 104d is used for slower rates of travel. A safe zone may be located on roadway 104. For example, roadway 104 may be disposed on a bridge having guard rails located at curbs 105. In this case, the safe zone may be identified as being in lane 104d, which may be associated with the slowest traffic.

Autonomous vehicle 120 is shown to include a sensor platform 121, a vehicle control unit 123, and an autonomy controller 150, one or more of which may include logic configured to detect an anomalous event and to navigate autonomous vehicle 120 to a safe zone. Sensor platform 121 may include any number of sensors 125a, 125b with which to facilitate autonomous control of autonomous vehicle 120. Examples of sensors include one or more image capture devices (e.g., cameras to capture video including high definition, or "HD," cameras), one or more radar devices, one or more LIDAR devices, one or more sonar devices (or sensors configured to detect ultrasound), one or more global positioning system ("GPS") devices, one or more inertial measurement units ("IMU") devices, and one or more other types of sensors. Vehicle control unit 123 may be coupled (e.g., mechanically and/or electrically) to steering and propulsion units through which to implement physical changes in steering, acceleration (e.g., throttling), deceleration (e.g., braking), and other components. For example, vehicle control unit 123 may include electronic interfaces with autonomy controller 150, and thus may be configured to receive data representing steering data (e.g., degree of wheel angle to effect a turn), acceleration data (e.g., an amount of throttle or power to apply to a drive train or the like), deceleration data (e.g., an amount of pressure to apply to brakes to reduce velocity), and the like. Vehicle control unit 123 may be further configured to apply control signals to electromechanical systems of autonomous vehicle 120, responsive to the above-described data. In some examples, vehicle control unit 123 may apply changes in steering, acceleration and deceleration at a rate of thirty (30) times a second or greater.

Autonomy controller 150 may include logic configured to recover from a particular anomalous event, or fault. The logic in autonomy controller 150 may include either hardware or software, or a combination thereof, and may be configured to perform any number of recovery processes to situate autonomous vehicle 120 in a less hazardous or safe condition. For example, autonomy controller 150 may be configured to detect objects in the environment, whether on or around roadway 104; detect the anomalous event; identify one or more safe zones 110a, 110b, and 110c; predict path segments (e.g., path segments 142b to 142f) for navigating autonomous vehicle 120 to avoid intercepting or colliding with one or more of objects during transit to a selected safe zone; and direct autonomous vehicle 120 to a selected safe zone, such as safe zone 110a. Examples of objects around which autonomy controller 150 may navigate include a moving vehicle 112b in lane 104d, one or more moving vehicles 112a and 112c in lane 104a, a sign ("mile marker") 128, a sign ("speed limit") 124, a sign ("exit") 122, traffic barriers ("cones") 126, a parked vehicle 113, and any other objects, whether moveable or non-moveable (e.g., relative to mass and momentum) obstacle, or whether animate or non-animate.

Diagram 100 depicts autonomy controller 150 including a map manager 152, a vehicle controller 154, and a safe recovery controller 156. Vehicle controller 154 may include logic configured to control any number of vehicle functions under either human or autonomous control. For example, vehicle controller 154 may determine a pose (e.g., a position) localized at a reference point 127 of autonomous vehicle 120. Reference point 127 may be identified relative to external objects and surfaces of an external environment (or scene), and may be correlated to a position on roadway 104, as described in map data 151. Thus, reference point 127 may be expressed in longitudinal and latitudinal coordinates for identifying a geographic location.

In some examples, vehicle controller 154 may be configured to implement object characterization and classification to identify types and attributes of objects (e.g., whether an object is dynamic or static, whether an object is animate, or living, rather than an inanimate object, etc.). Examples of external classified objects include cars, signs, cones, trees, pedestrians, cyclists, dogs, fire hydrants, etc., and examples of classified external surfaces include pavement of roadway 104, surfaces or contours of adjacent buildings (not shown) or adjacent structures, such as communication tower 134, and the like.

Further, vehicle controller 154 may be configured to generate trajectories or paths of travel 142a, 145a in accordance with a planned route to guide the transiting of autonomous vehicle 120 from origination point "A" to destination point "B" (not shown). For a trajectory or path of travel 142a, 145a, vehicle controller 154 may determine a number of path segments constituting a path of travel. To transit along a segment, vehicle controller 154 may compute a number of drive parameters that may be applied incrementally to mechanical drive components (e.g., at a rate of 30 sets of drive parameters for every second) to cause autonomous vehicle 120 to automatically drive along path segments over roadway 104. Hence, vehicle controller 154 may be configured to compute one or more drive parameters which to apply to vehicle control unit 123, including driving control signals to effect propulsion, steering, braking, lighting (e.g., emergency flashers), sound (e.g., automatic horn alerts), etc.), among other functions.

Map manager 152 may be configured to implement map data 151 to localize and navigate autonomous vehicle 120 relative to roadway 104, which may be represented as image data. Map data 151 may include relatively high resolutions of images of roadway 104 and adjacent objects, such as signs 122, 124, and 128, or adjacent safe zones 110a to 110c. Autonomy controller 150 may use map data 151 to identify external imagery to facilitate route planning (e.g., planning paths of travel relative to roadway 104 as depicted in map data 151). Map data 151 may include image data representing lane markings for lanes 104a to 104d, as well as data representing lane widths and curbs 105 or curb markings. In some examples, map data 151 may include image data having image resolutions greater than 640×480, such as high definition resolutions of 1280×720, 1920×1080, 2560×1600, or greater. Further, one or more cameras may operate to capture imagery at any range of wavelengths or any spectral bands of light, regardless of an HD resolution. For example, a camera may be configured to capture images in the visible light or infrared light spectra. Thus, map data 151 may include images depicted in the visible light spectra, the infrared light spectra, or the like. Map data 151 may also include any type of map data, such as 2D map data, 3D map data, 4D map data (e.g., includes three dimensional map data at a particular point in time), or the like. Additionally, map data 151 may include route data, such as road network data, including, but not limited to, route network definition file ("RNDF") data (or similar data) and the like.

Map manager 152 may also be configured to generate a dynamic representation of map data 151 by fusing or combining static map data (e.g., image data representing visual characteristics of roadway 104 and static objects, such as signs 122 to 128) and dynamic map data. In some examples, dynamic map data may include data representing objects detected via image capture (and/or other sensor data, including lidar), whereby the objects may have attributes indicative of dynamism, such as a pedestrian or a cyclist. In at least one case, dynamic map data may include temporally-static objects, which may be temporally static for a certain duration of time (e.g., during construction) and may be added or removed dynamically from a mapped environment. Examples of temporally-static objects include a parked car 113 and traffic cones 126, both of which may be omitted initially from map data 151. However, parked car 113 and traffic cones 126 may be included in a dynamic representation of map data 151 by including objects 113 and 126 in a map as those objects are captured.

According to some examples, map manager 152 may receive map update data 136 with which to apply to map data 151 for updating, for example, features or objects in imagery of an external environment. In some cases, map update data 136 may originate from other autonomous vehicles 120 (not shown) or other vehicles having similar image capturing capabilities (e.g., HD cameras as sensors 125a and 125b) that may have transited over roadway 104 prior to the arrival of autonomous vehicle 120. Similarly, autonomous vehicle 120 may transmit map variant data 135, such as recently-added traffic cones 126 (or pot holes) as well as recently-removed trees or signs, via communication tower 134 and network 130 to a vehicular autonomy platform 130. Thus, changes in an environment adjacent to roadway 104 may be captured and used to generate updated map data at a vehicular autonomy platform 130, which, in turn, may propagate update map data 136 to any number of autonomous vehicles 120 to revise on-board maps. Autonomy controllers 150 may use the revised on-board maps to more accurately and precisely navigate within the environment encapsulating roadway 104, such as when autonomous vehicle 120 drives to safe zones 110a to 110c during emergency situations. Moreover, selection of one of safe zones 110a to 110c may be affected (e.g., excluded from selection) based on map update data 136, such as if the updated map data indicates obstructions had recently been disposed in a previously-determined safe zone.

Safe recovery controller 156 may include logic configured to detect anomalous events that may give rise to hazardous conditions or emergency situations due to, for example, operational faults or failures of sensors (or other components) of an autonomous vehicle 120. Safe recovery controller 156 may be further configured to implement one or more actions to resolve or mitigate a hazardous or emergency situation, such as directing autonomous vehicle 120 to a safe zone 110 to 110c. A hazardous or emergency situation may arise from one or more anomalous events that may be based on, for example, one or more faults during one or more different modes of operation (e.g., human-controlled driving or autonomously controlled driving, etc.) or conditions (e.g., seasonal conditions that may affect roadway 104, including snow, ice, rain, a level of ambient light due to the time of day or night, etc.).

Examples of faults (or failures) include non-operative sensors, such as a non-operational camera, non-operational radar, non-operational lidar, an non-operational localization device or sub-system (e.g., including GPS devices, IMU devices, gyroscopes, etc.), or any other sensor. Examples of faults also may include sensors operating intermittently within normal or expected ranges of operation, as well as sensors that operate sub-optimally, but may provide less than normal amounts of sensor data or reduce quality of sensor data (e.g., operating within an acceptable range of operation but outside normal or expected ranges of operation). For example, one or more cameras may produce imagery of reduced quality due to one or more of (1) occlusions on the lens due to salt spray or rain water, (2) fog, (3) reduced ambient light (e.g., as at night), and (4) any other condition. Other faults may include power outages to one or more components, such as a loss of power to sensors on one side of autonomous vehicle 120. For example, diagram 100 depicts a "blind" area 129 in which objects may not be detected due to a loss of sensor data (e.g., due to loss of power to one or more cameras, lidars, radars, etc.). Faults may also include any electrical or mechanical malfunctions that may affect autonomous vehicle 120. Faults, for example, may include an immediate and complete loss of tire pressure, improper operation of one or more braking systems, a loss of external illumination (e.g., head and tail lights) during nighttime conditions, and the like. Safe recovery controller 156 may receive data including patterns of normative sensor values and conditions, as well as any other information, against which sensed sensor data from sensor platform 121 may be compared to classify one or more faults as an anomalous event. In some cases, a fault may be classified a condition within a range extending from a least urgent condition (e.g., a non-operative tail light) to a most urgent condition in which safety of one or more occupants or external persons may be at risk.

Safe recovery controller 156 may be configured to receive images of locations of one or more safe zones 110 to 110c captured via any of one or more sensors 125a and 125b, which may be implemented as cameras that may capture images of the environment associated with roadway 104 at resolutions (e.g., HD images) described herein. Examples of high definition ("HD") cameras include cameras having image resolutions greater than 640×480, such as 1280×720, 1920×1080, 2560×1600, or greater. Further, one or more cameras may operate to capture imagery at any range or spectral band of light. For example, a camera may be configured to capture images in the visible light or infrared light spectra.

During normal modes of operation, such as during travel in lane 104c to an eventual destination, safe recovery controller 156 may continuously (or nearly continuously at discrete points in time) identify potential safe zones. For example, safe recovery controller 156 may access map data 151 (or portions thereof) to identify locations of safe zones 110a to 110c associated with a path of travel, such as travel path 142a. The locations of safe zones 110a to 110c may be determined relative to localization at reference point 127 and positions of static objects, such as signs 122 to 128. Hence, safe zones 110a to 110c may be identified based on comparing camera/image data from sensors 125a, 125b and map data 151.

Safe recovery controller 156 may analyze image data at multiple points 188 via path of travel 142a or 145a using image data from cameras 125a and 125b and map data 151 to confirm locations of safe zones 110a to 110c and predicted recovery paths of travel associated with one or more points 188. Also, safe recovery controller 156 may analyze image data to predict recovery paths of travel based on one or more points 188. For example, safe recovery controller 156 may compute, when autonomous vehicle 120 is at its present position depicted in diagram 100, an action to be performed at point of travel 188a to steer autonomous vehicle 120 onto a recovery path that includes a recovery path segment ("C") 145c. When autonomous vehicle 120 travels to (or nearly to) point 188a and an anomalous event is detected, recovery path segment ("C") 145c and pre-computed alternate drive parameters are used to direct the vehicle to safe zone 110b via segment 145c. Therefore, safe recovery controller 156 may transmit a control signal to cause vehicle controller 154 to replace drive parameters with the alternate drive parameters upon detection of an anomalous event. In response, vehicle control unit 123 may apply the alternate drive parameters (e.g., steering parameters, accelerating parameters, braking parameters, etc.) to guide autonomous vehicle 120 to safe zone 110b.

In some examples, safe recovery controller 156 may identify safe zone 110b and safe zone 110c at point 188b, and may compute corresponding actions to guide autonomous vehicle 120 to respective safe zones 110b and 110c. Further, safe recovery controller 156 may determine that image data from sensors 125a, 125b may include data representing an occlusion associated with safe zone 110a. The presence of an occlusion may be confirmed by comparing the image data to map data 151. For example, sensor data from sensors 125a, 125b may include an image of obstacles, such as traffic cones 126, that may be present at the location for safe zone 110a. Thus, safe recovery controller 156 may implement a subset of alternate drive parameters for recovery path segment 145c to guide the vehicle to safe zone 110b, thereby excluding safe zone 110c (and associated alternate drive parameters) from consideration.

Note that detected occlusions 126 at location of safe zone 110c may be transmitted as map variant data 135 via radio circuitry (e.g., RF, cellular, etc.), which is not shown, to network 132, which, in turn, propagates map variant data 135 (e.g., image of occlusion 126) to a computing device implemented as at least a portion of vehicular autonomy platform 130. Vehicular autonomy platform 130 then may generate an updated standard map that, in turn, may be disseminated (e.g., downloaded) as update map date 136 to any number of autonomy controllers 150 to update map data 151 at corresponding autonomous vehicles 120. Note, too, that data may be exchanged with autonomous vehicle 120 via vehicle-to-vehicle ("V2V") data links or vehicle-to-infrastructure ("V2I"), among other communication media, protocols, and technologies.

Consider another example in which safe recovery controller 156 may be further configured to compute alternate drive parameters with which to apply to vehicle controller 154 to facilitate navigation around and among multiple obstacles in motion, such as traveling cars 112a and 112c, when guiding autonomous vehicle to a safe zone, such as safe zone 110a, via a recovery path of travel. In this example, the recovery path of travel may include a number of actions to be performed at particular times and/or positions (e.g., in space relative to roadway 104). An action may be associated with one or more of recovery path segments 142b to 142f. Continuing with the present example, safe recovery controller 156 may compute, when autonomous vehicle 120 is at its present position depicted in diagram 100, an action to be performed at point of travel 188c (e.g., upon detection of an anomalous event) to steer autonomous vehicle 120 onto a recovery path that includes a recovery path segment ("2") 142b, a recovery path segment ("3") 142c, a recovery path segment ("4") 142d, a recovery path segment ("5") 142e, and a recovery path segment ("6") 142f. So, safe recovery controller 156 may compute at point of travel 188b the predicted actions to be initiated at point 188c if an autonomous event occurs when autonomous vehicle 120 is at or near point 188c. As autonomous vehicle 120 travels along path of travel 142a, safe recovery controller 156 computes (e.g., re-computes) actions, recovery path segments 142b to 142f, and corresponding subsets of alternate drive parameters at intervening points 188 (between points 188b and 188c). For example, safe recovery controller 156 may generate or update estimates of velocities, accelerations, and directions for each traveling car 112a and 112b.

Safe recovery controller 156 may detect at point 188c (on travel path 142) that a suite of sensors on the right-hand side are inoperable or are generating degraded sensor data, thereby causing formation of a "blind spot" 129 with which sensor data is degraded or non-existent. In this case, safe recovery controller 156 may be less capable to use sensors to detect traveling cars in lane 104a or to safely guide or direct autonomous vehicle 120 to a safe zone on the right-hand side, such as safe zone 110c. Hence, safe zones on the left-hand side are viable options as the sensors on the left-hand side may be used to guide the vehicle to safe zone 110a. At point 188c, safe recovery controller 156 may implement pre-computed actions to effect travel to safe zone 110a due to the loss of right-hand sensors.

A first action may include steering autonomous vehicle from lane 104c to lane 104b, which is associated with a subset of alternate drive parameters for recovery path segment 142b that are applied incrementally by vehicle control unit 123 to a throttle, to a steering mechanism, to a braking system, etc. Emergency flashers and other safety-related features and functions may also be triggered or activated. During transit via recovery path segment 142b (and during subsequent recovery path segments), safe recovery controller 156 continues to monitor the environment, including the velocities of traveling cars 112a and 112b, and, when applicable, may also modify alternate drive parameters if behaviors of traveling cars 112a and 112b change (e.g., a car may speed up, slow down, or change lanes). A second action may include maintaining autonomous vehicle in transit along lane 104b, whereby another subset of alternate drive parameters are applied incrementally for recovery path segment 142c. A third action may include reducing speed in lane 104b to match a velocity that permits autonomous vehicle to enter lane 104a at a gap 190 between traveling cars 112a and 112b. Thus, a subset of alternate drive parameters corresponding to recovery path segment 142d may be applied incrementally at predicted times and/or positions (e.g., at X, Y, and Z coordinates related to map data 151 referenced to roadway 104) to reduce velocity (e.g., a combination of braking and deceleration) and change steering directions for autonomous vehicle 120. A fourth action may include maintaining autonomous vehicle in travel along lane 104a, whereby an associated subset of alternate drive parameters may be applied incrementally for recovery path segment 142e, which enables autonomous vehicle to clear or pass parked vehicle 113. A fifth action may include exiting lane 104a onto a shoulder and reducing speed so that autonomous vehicle 120 may stop at safe zone 110a in accordance with the application of alternate drive parameters that correspond to recovery path segment 142f.

According to some examples, map data 151 may include data representing identifiers or references to executable code that performs a pre-calculated recovery action based on motion characteristics of an autonomous vehicle at a certain point. Implementation of a pre-calculated recovery action may resolve an anomalous event with reduced computations, or without performing, for example, complex computations in real-time (or near real-time) to determine recovery paths. In this example, consider that map data 151 includes data representing a glide path 146 associated with safe zone 110b. Glide path 146 may include waypoints 147 and 148, whereby a waypoint 147, 148 may be associated with, or may include, executable instructions to guide autonomous vehicle 120 to safe zone 110b. A waypoint 147, 148 may also be associated with a geographic location on roadway 104. Therefore, safe recovery controller 156 may identify glide path 146 in map data 151, and, upon detecting an anomalous event at point 188c, safe recovery controller 156 may cause autonomous vehicle 120 to steer onto recover path segment 145b to intercept waypoint 148 on glide path 146. When autonomous vehicle 120 coincides or nearly coincides with a geographic location of waypoint 148, vehicle controller 154 may retrieve motion characteristics (e.g., speed, direction, fault type, etc.) of autonomous vehicle 120 and apply values representing those motion characteristics to the executable instructions, which, in turn, perform a pre-calculated routine that guides the vehicle into safe zone 110b via glide path 146.

In one example, autonomy controller 150 may determine a level of urgency associated with a fault resulting in limited mobility or navigational ability. In low levels of urgency, a safe zone may be bypassed if obstructed. By contrast, during high levels of urgency, autonomy controller 150 may determine whether an obstacle is non-animate, but movable or deformable, such as traffic cones 126. Also, autonomy controller 150 may determine whether an obstacle is an animate (e.g., a person or animal) or non-movable object (e.g., another vehicle that is parked). Thus, during high levels of urgency, autonomy controller 150 may drive autonomous vehicle 120 into an obstructed safe zone 110c regardless of the presence of traffic cones 126. In one instance, the safety of the occupants of autonomous vehicle 120 may be prioritized over any damage to the vehicle or to a non-animate obstacle. To illustrate, consider that a fault condition arises instantaneously during a moment when a heavy vehicle (e.g., cement truck) is traveling closely behind autonomous vehicle 120 at a high rate of speed. Safe recovery controller 156 may determine it likely that the heavy vehicle might rear-end autonomous vehicle 120 if the autonomous vehicle stops in the lane of travel, which is adjacent to obstructed safe zone 110c. Therefore, autonomy controller 150 may reduce risk to life and limb of the occupants by directing autonomous vehicle 120 into safe zone 110c (regardless of damage). By contrast, if safe recovery controller 156 determines an object or obstacle in safety zone 110c may be a person or an animal (e.g., a child walking a dog), safe recovery controller 156 may exclude safety zone 110c from consideration. Thus, safe recovery controller 156 may then activate emergency flashers and come to stop in an adjacent lane (if unobstructed) or in the same lane (if adjacent lanes are obstructed by moving vehicles).

Note that anomalous events may be categorized at different levels of urgency as a function of, for example, a degree of risk of harm to the occupants, a degree of risk of harm to external persons or animals, a degree of risk of harm or damage to the vehicle, a degree of risk of damage to an external non-animate object, and the like. Therefore, safe recovery controller 156 may consider prioritizing the use of certain safe zones 110a and 110c based on an identified category for an anomalous event. For example, if an immediate stop is required, safe zone 110c may be prioritized highest if obstacles 126 are absent.

Figure 2:
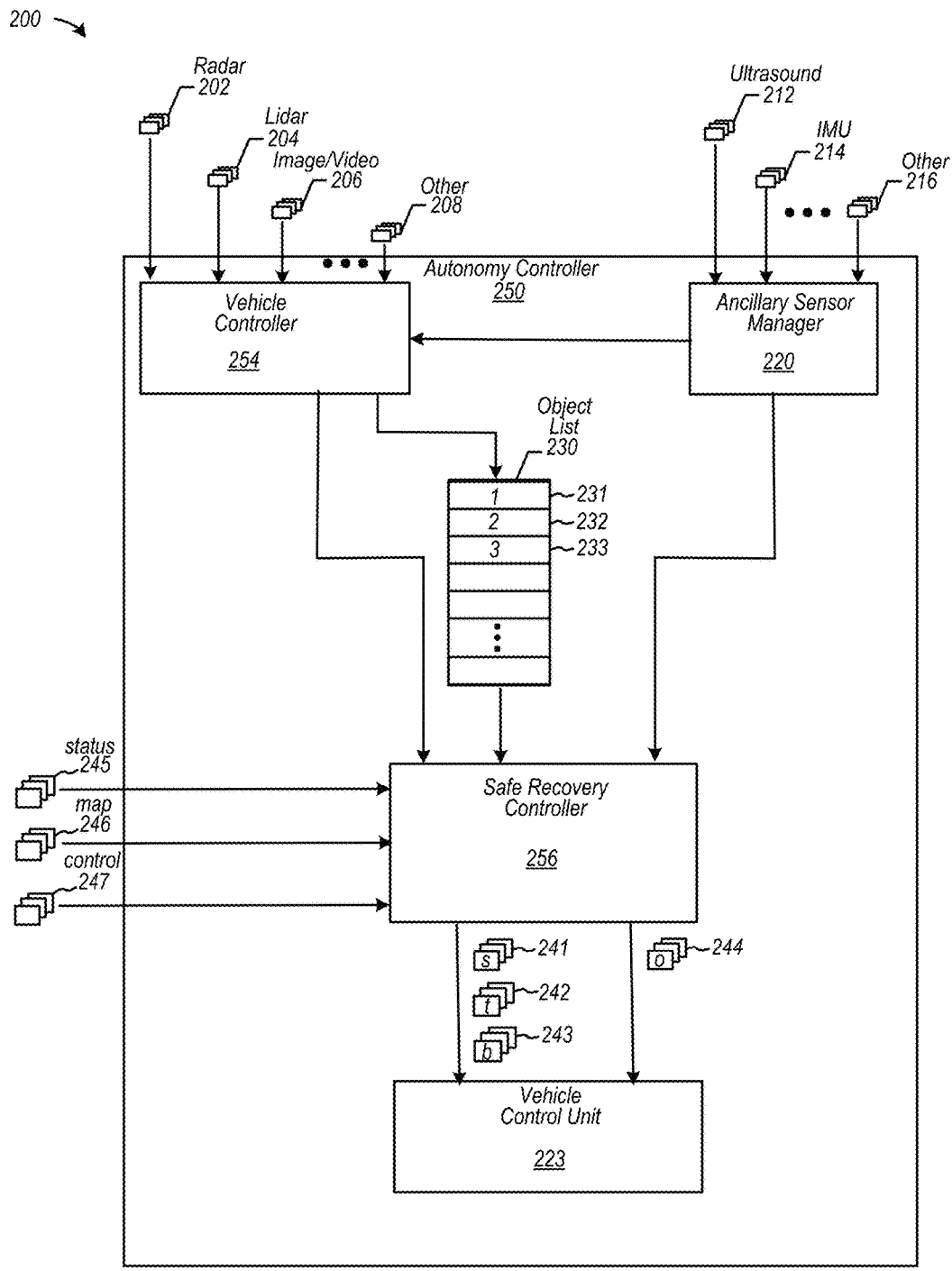
FIG. 2 is a diagram depicting another example of a safe recovery controller, according to some embodiments.

FIG. 2 is a diagram depicting another example of a safe recovery controller, according to some embodiments. Diagram 200 depicts autonomy controller 250 including a vehicle controller 254 configured to generate an object list 230. Autonomy controller 250 also includes an ancillary sensor manager 220, a safe recovery controller 256, and a vehicle control unit 223. As shown, autonomy controller 250 may be configured to receive radar sensor data 202, lidar sensor data 204, image/video data 206, and other sensor data 208, each of which may be received into vehicle controller 254. Autonomy controller 250 also may be configured to receive ultrasound sensor data 212, inertial measurement unit ("IMU") data 214, and other sensor data 216 (e.g., GPS data), each of which may be received into ancillary sensor manager 220 or any component of autonomy controller 250. Ancillary sensor manager 220 may, in some examples, be configured to facilitate localization or any other function performed by components of an autonomous vehicle. In the example shown, vehicle controller 254 may detect and classify objects to generate an object list 230, which includes a list of objects, such as object ("1") 231, object ("2") 232, object ("3") 233, etc. The objects may represent detect and/or classified objects detected by one or more sensors. For example, objects 231, 232, and 233 may include static objects, such as a sign, and dynamic objects, such as a pedestrian. In some examples, object list 230 may be generated at 30 frames per second, or at other frame rates.

Further, autonomy controller 250 may receive status data 245, map data 246, and control data 247. Status data 245 may include state data about one or more components or sub-systems of an autonomous vehicle (e.g., existence of high temperatures in an electrical power plant or in other electronics, a state of power degradation or voltage degradation, etc.). Control data 247, which may be optionally applied, may include data representing supplemental commands originating from, for example, a vehicular autonomy platform (not shown). One or more elements depicted in diagram 200 of FIG. 2 may include structures and/or functions as similarly-named or similarly-numbered elements depicted in other drawings, or as otherwise described herein, in accordance with one or more examples.

According to some examples, safe recovery controller 256 may be configured to perform path planning, such as selecting an optimal path of travel that is collision-free, among other things. Safe recovery controller 256 may compute any number of paths of travel and select an optimal path of travel based on map data 246, object list 230, and other data, including sensor data, and factors. Safe recovery controller 256 may also generate drive parameters as (or as part of) command data, such as steering data 241, throttle data 242, braking data 243, or any other data 244, for execution by vehicle control unit 223.

Any functionality of one or more components of autonomy controller 250 (e.g., vehicle controller 254, ancillary sensor manager 220, safe recovery controller 256, and vehicle control unit 223) may be combined with any other component or may be distributed among any number of other components. In one example, either safe recovery controller 256 or vehicle controller 254, or a combination thereof, may be configured to perform one or more functions of an advanced driver assistance system ("ADAS") to control an autonomous vehicle. In some examples, autonomy controller 250 and any of its one or more components may be implemented in hardware or software (or a combination thereof). According to some examples, logic implemented in autonomy controller 250 may include executable instructions based on C++ programming languages, or any other programming language.

Figure 3:
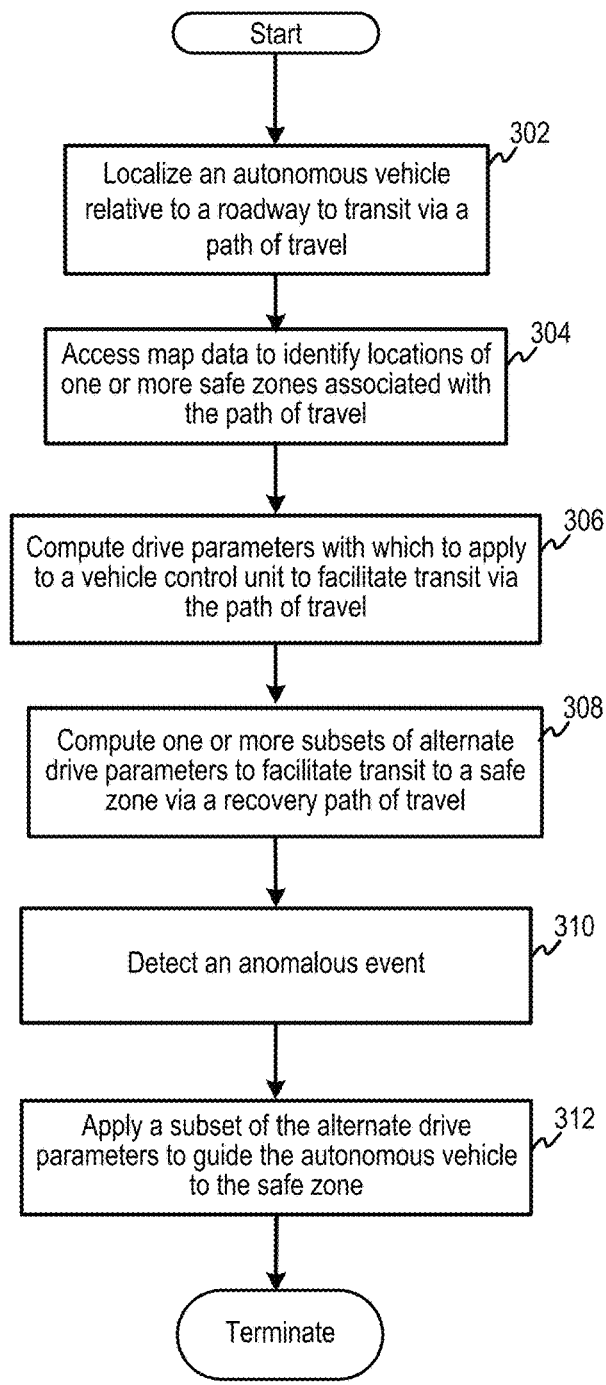
FIG. 3 is a flow diagram depicting an example of recovering from one or more faults, according to some embodiments.

In a specific example, one or more components of autonomy controller may be implemented as one or more processors, such as one or more graphics processing units ("GPUs") configured to implement a framework and programming model suitable for GPUs. For example, a programming language, such as 'Compute Unified Device Architecture' ("CUDA")-based language, or any other compatible programming language that may be used to program the GPUs. CUDA™ is produced and maintained by NVIDIA of Santa Clara, Calif. Note that other programming languages may be implemented, such as OpenCL, or any other parallel programming language FIG. 3 is a flow diagram depicting an example of recovering from one or more faults, according to some embodiments. Flow 300 begins at 302, at which an autonomous vehicle may be localized relative to a roadway over which the autonomous vehicle is transiting via a path of travel. The autonomous vehicle also may implement high definition map data to localize it within an environment that includes the roadway. An autonomous vehicle, as described with respect to flow 300 or any other figure, may refer to any vehicle which has logic or an automated driving system configured to perform any level of automated driving, according to various embodiments. For example, an autonomous vehicle may refer to a level 4 automated vehicle (e.g., "high automation"), as well as an automated vehicle at level 3 (e.g., conditional automation) or at level 5 (e.g., full automation), whereby such levels are defined by SAE International ("SAE") of Warrendale, Pa., USA, or as adopted by the National Highway Traffic Safety Administration of Washington, D.C., USA. An autonomous vehicle, as described herein, may be described as an "autonomous-capable vehicle," which can be controlled by either a human or autonomous logic, or both, at least in some examples.

At 304, map data may be accessed to identify locations of one or more safe zones associated with the path of travel. In some examples, the map data include images in high resolutions (e.g., very high resolutions) and include granular details of an environment or scene in which an autonomous vehicle is driving to ensure accurate and precise localization, object detection and classification, navigation, path of travel generation (e.g., trajectory generation), etc., as well as ensuring safe guidance to a safe zone. According to some implementations, portions of map data associated with a planned route along various paths of travel may be downloaded (e.g., as adjacent blocks of grid-type HD map data) as an autonomous vehicle travels along the route, thereby preserving resources (e.g., relatively large amount of storage need not be required to store an entire HD map of a particular region, such as a country).

Note that map data stored on board an autonomous vehicle may include data represented regions that may be masked or otherwise identified as "unsafe" spots or regions. Therefore, in some examples, a safe zone may be any region or area on a map that excludes a designation of "unsafe." The map data may include a subset of data representing a static layer of various environments and static objects therein, and also may include a dynamic layer of dynamic objects detect by sensors (e.g., in real-time), whereby the static and dynamic layers may be used in combination to identify safe zones and provide navigation routes or paths to identify safe zones.

At 306, drive parameters may be computed to apply to a vehicle control unit to facilitate transit via a path of travel, or a portion thereof, between a point of origin and a point of destination. Drive parameters may include values of steering angles (e.g., a fraction of a degree of an angle to turn a wheel per unit of time, such as $\frac{1}{30}^{th}$ of a second), values of a throttle (e.g., a change in amount of throttle per unit of time to obtain an acceleration or velocity), and values of braking pressure (e.g., a change in amount of pressure per unit time to effect a target deceleration rate), among other values. According to some examples, drive parameters may be computed when a human is providing control, but in this case, transmitted commands to apply parameters may be invalidated so as to implement user control, which may be instantaneously (or nearly instantaneously) switched to autonomous control upon validation of transmitted drive parameters.

At 308, one or more subsets of alternate drive parameters may be computed to facilitate travel to a safe zone via a recovery path of travel. The alternate drive parameters may be of the same type of parameters as drive parameters. However, drive parameters may be used to control automated driving of a vehicle along a path of travel, whereas alternate drive parameters may be used to direct an autonomous vehicle to a safe zone. A subset of alternate drive parameters may be generated or computed to automatically drive a vehicle via a corresponding recovery path to a specific safe zone. In various examples, multiple subsets of alternate drive parameters may be generated for driving automatically to multiple corresponding safe zones. The multiple subsets of alternate drive parameters may be generated prior to reaching a point on a path of travel that the autonomous vehicle is yet to traverse. The point may be a predicted point on a path of travel that an autonomous vehicle is estimated to intercept, the alternate drive parameters being generated relative to the predicted point.

At 310, an anomalous event may be detected, the event being a fault, a degradation of performance, a failure, etc. of one or more sensors, or of any component or sub-system of an autonomous vehicle.

At 312, a subset of the alternate drive parameters may be applied to, for example, a vehicle control unit to guide an autonomous vehicle to a safe zone. At least one safe zone may be selected as a refuge due to a failure. The selected subset of the alternate drive parameters that is used to automatically drive the vehicle to a selected safe zone may coincide with a predicted point of travel associated with the subset of alternate drive parameters. Thus, when the location of the autonomous vehicle coincides (or substantially coincides) with the predicted point, a safe recovery controller may select the corresponding alternate drive parameters to enable the vehicle to follow a pre-calculated recovery path (e.g., pre-calculated prior to the autonomous vehicle intercepting the predicted point).

In some examples, a communication subsystem (e.g., RF, cellular, etc. radio circuitry) may be implemented to transmit a request for assistance to at least a vehicular autonomy platform. When at a safe zone, the logic in an autonomous vehicle may perform diagnostic tests or power cycling to determine whether a fault may be removed or corrected, or whether operational characteristics of one or more degraded components may be sufficient to continue traveling with minimal risk. If so, the automated vehicle may "limp" to a final destination until repairs may be made.

Note that logic of an autonomy controller may be configured to countermand or invalidate application of a subset of alternate drive parameters if, for example, the logic detects activation of a vehicular drive control (e.g., implementation of a steering wheel, acceleration pedal, brake pedal, etc.) after the anomalous event is detected. In some cases, activation of the vehicular drive control may be indicative of a state in which a driver is intervening with the drive controls during a transit of a recovery path of travel. In response to human intervention, control signals to facilitate application of the subset of alternate drive parameters may be invalidated.

Figure 4:
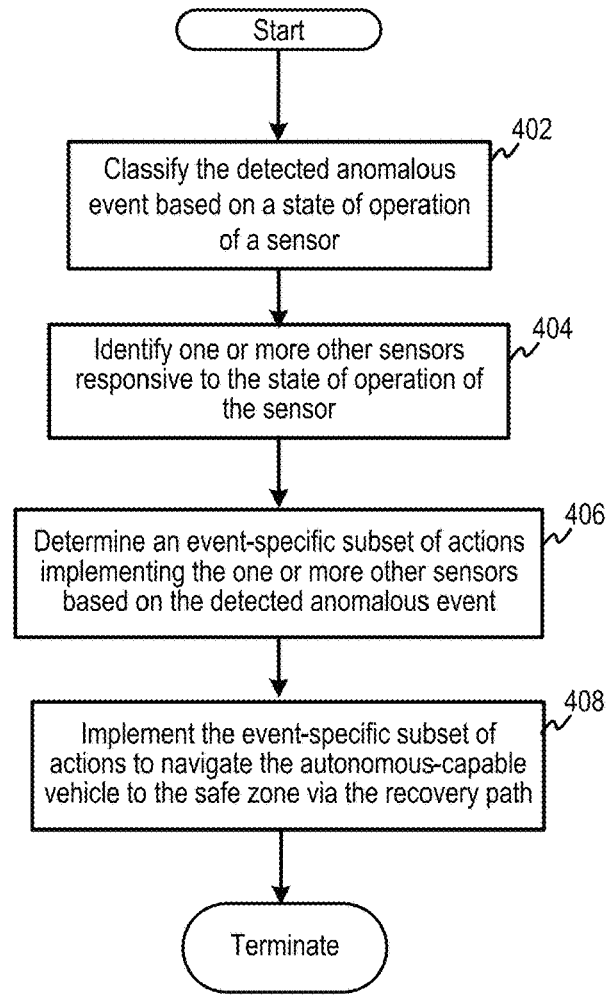
FIG. 4 is a flow diagram depicting an example of classifying a fault during a recovery process, according to some embodiments.

FIG. 4 is a flow diagram depicting an example of classifying a fault during a recovery process, according to some embodiments. Flow 400 begins at 402, at which a detected anomalous event is classified or categorized. For example, the anomalous event may be classified based on a state of operation of a sensor of, for example, a first sensor type, such as an image capture device (e.g., camera). In particular, one or more cameras (as a first sensor type) may be operating at the margins (e.g., degraded beyond a range of acceptable operation) such that it can be classified or characterized as a "failed camera" anomalous event. Further to 402, one or more faults may be optionally classified based on a level of urgency, which may range from a least urgent condition (e.g., a non-operative tail light) to a most urgent condition in which safety of one or more occupants or external persons may be at risk.

At 404, one or more other sensors responsive to the state of operation of the sensor may be identified. Therefore, a determination or computation of alternate drive parameters that use camera data may perform such computations using one or more other sensors to compensate for the failing or degraded operation of the first sensor type. For example, radar sensor data or lidar sensor data, or both, may be used to compensate for poor, negligible, or no camera data.

At 406, an event-specific subset of actions may be determined. The event-specific subset of actions may be configured to implement one or more other sensors based on the detected anomalous event. For example, alternative methods to compute alternate drive parameters may be implemented to form revised drive parameters (e.g., revised based on omitting or deemphasizing camera data by using or emphasizing radar or lidar data). Thus, a recovery path to a safe zone may be calculated based on revised sensor data that may be different than as computed prior to the detection of the anomalous event. For example, camera data may be used to generate alternate drive parameters prior to a camera failure, but once a camera failure is detected, revised drive parameters may be computed using radar or lidar data, or both. Note that the above description of a recovery process (e.g., event-specific subset of actions) to recover from a camera fault as an anomalous event is exemplary and not intended to be limiting. For example, any number of event-specific subset of actions for any number of failures or faults, such as failures or faults relating to lidar, radar, and other sensors, as well as mechanical and/or electrical components (e.g., HVAC systems, lighting systems, braking systems, steering systems, communication systems, etc.) and any other faults affecting an autonomy controller, such as software problems, exceptions, application program crashes, security flaws, etc.

At 408, an event-specific subset of actions to navigate the autonomous-capable vehicle to the safe zone via the recovery path may be implemented. In particular, a camera failure (e.g., as an event-specific failure) may cause generation of the event-specific subset of actions to enable an autonomous vehicle to reach a safe zone based on revised drive parameters determined in 406. Thus, the event-specific subset of actions may result in excluding from consideration a safe zone based on inability to identify a viable recovery path to that safe zone.

Figure 5:
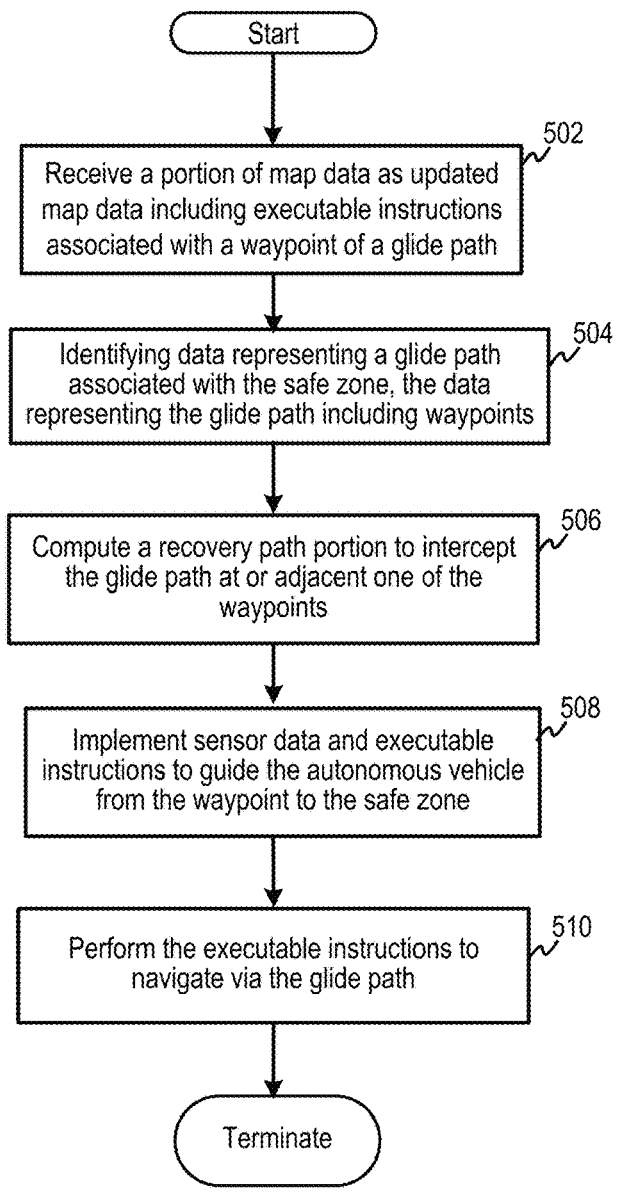
FIG. 5 is a flow diagram depicting an example of implementing a glide path to a safe zone, according to some embodiments.

FIG. 5 is a flow diagram depicting an example of implementing a glide path to a safe zone, according to some embodiments. Flow 500 begins at 502, at which a portion of map data, as updated map data, may be received. The updated map data may include, or reference (e.g., using pointers), executable instructions associated with a waypoint of a glide path. In some examples, a glide path may refer to pre-calculated recovery paths (and portions thereof) that may be computed prior to any anomalous event and independent from a particular autonomous vehicle. For example, a computing device at a vehicular autonomy platform may determine glide paths to respective safe zones, whereby data representing the glide paths may be integrated into map data that is downloaded into any number of autonomous vehicles. A glide path may refer to any number of pre-computed solutions to a subset of detected faults.

At 504, data representing a glide path associated with the safe zone may be identified. The data representing the glide path may include waypoints. A waypoint may represent either a pointer to commands (e.g., executable code) or may include commands that may be disposed, for example, in the map data. The executable code may be relatively efficient, at least in some cases, than computing a number of alternate drive parameters.

At 506, a recovery path portion may be computed (e.g., prior to detecting the anomalous event) to intercept the glide path at or adjacent one of the waypoints. Once the automated vehicle intercepts a waypoint, the map-based glide paths may take over to provide commands to drive the vehicle to a safe zone.

At 508, sensor data and executable instructions to guide the autonomous vehicle from the waypoint to the safe zone may be implemented. For example, values from one or more sensors may be input into the executable instructions to facilitate implementation of the glide path. Therefore, executable instructions may be performed at 510 to cause an autonomous vehicle to navigate via a glide path, and, in turn, to a safe zone.

Figure 6:
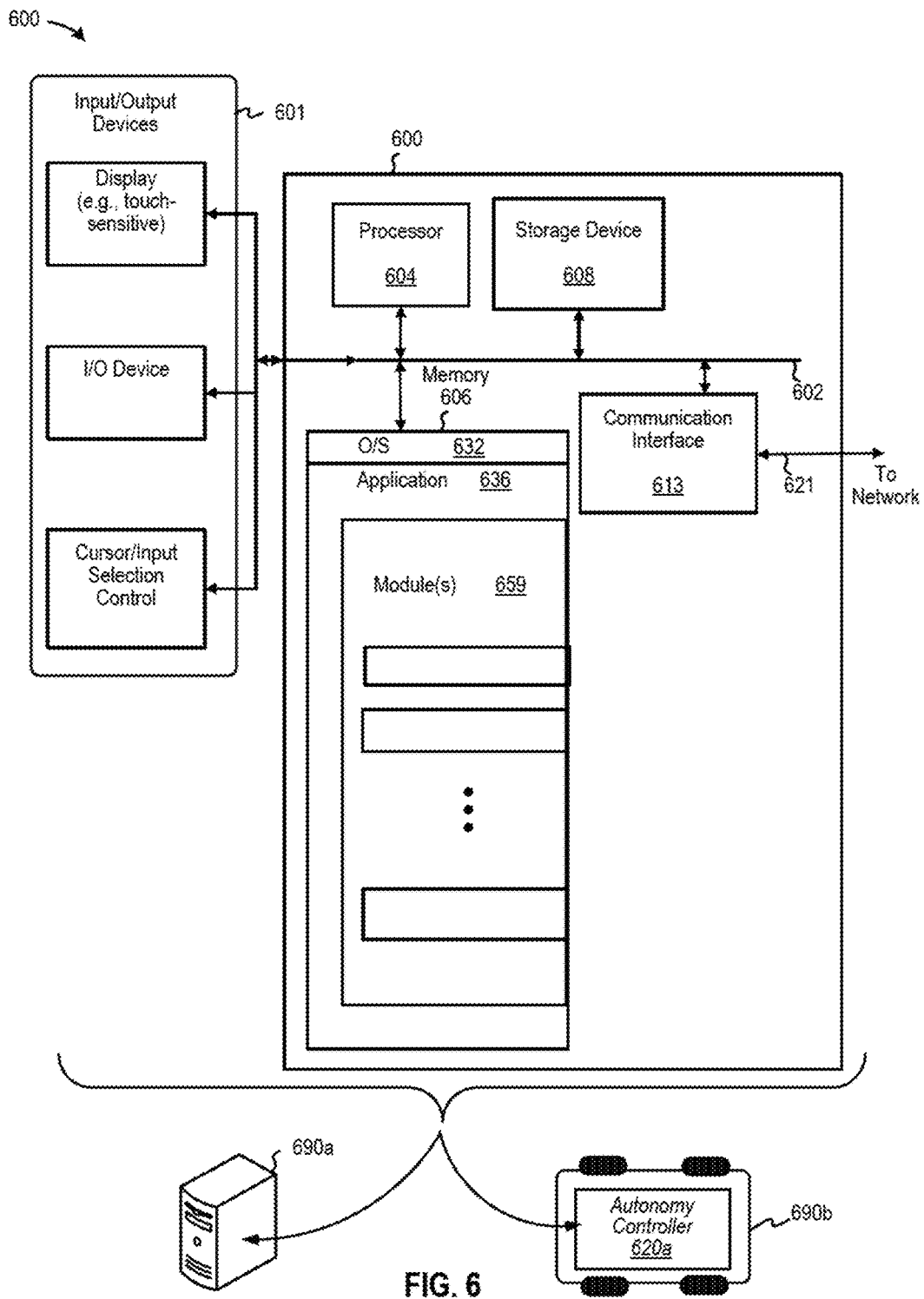
FIG. 6 illustrates examples of various computing platforms configured to provide various functionalities to components of an autonomy controller, according to various embodiments.

FIG. 6 illustrates examples of various computing platforms configured to provide various functionalities to components of an autonomy controller, according to various embodiments. In some examples, computing platform 600 may be used to implement computer programs, applications, methods, processes, algorithms, or other software, as well as any hardware implementation thereof, to perform the above-described techniques.

In some cases, computing platform 600 or any portion (e.g., any structural or functional portion) can be disposed in any device, such as a computing device 690a, autonomous vehicle 690b, and/or a processing circuit in forming structures and/or functions of a an autonomy controller 620a, according to various examples described herein.

Computing platform 600 includes a bus 602 or other communication mechanism for communicating information, which interconnects subsystems and devices, such as processor 604, system memory 606 (e.g., RAM, etc.), storage device 608 (e.g., ROM, etc.), an in-memory cache (which may be implemented in RAM 606 or other portions of computing platform 600), a communication interface 613 (e.g., an Ethernet or wireless controller, a Bluetooth controller, NFC logic, etc.) to facilitate communications via a port on communication link 621 to communicate, for example, with a computing device, including mobile computing and/or communication devices with processors, including database devices (e.g., storage devices configured to store atomized datasets, including, but not limited to triplestores, etc.). Processor 604 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 600 exchanges data representing inputs and outputs via input-and-output devices 601, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 601 may be implemented as, or otherwise substituted with, a user interface in a computing device associated with a user account identifier in accordance with the various examples described herein.

According to some examples, computing platform 600 performs specific operations by processor 604 executing one or more sequences of one or more instructions stored in system memory 606, and computing platform 600 can be implemented in a client-server arrangement, peer-to-peer arrangement, or as any mobile computing device, including smart phones and the like. Such instructions or data may be read into system memory 606 from another computer readable medium, such as storage device 608. In some examples, hard-wired circuitry may be used in place of or in combination with software instructions for implementation. Instructions may be embedded in software or firmware. The term "computer readable medium" refers to any tangible medium that participates in providing instructions to processor 604 for execution. Such a medium may take many forms, including but not limited to, non-volatile media and volatile media. Non-volatile media includes, for example, optical or magnetic disks and the like. Volatile media includes dynamic memory, such as system memory 606.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 602 for transmitting a computer data signal.

In some examples, execution of the sequences of instructions may be performed by computing platform 600. According to some examples, computing platform 600 can be coupled by communication link 621 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 600 may transmit and receive messages, data, and instructions, including program code (e.g., application code) through communication link 621 and communication interface 613. Received program code may be executed by processor 604 as it is received, and/or stored in memory 606 or other non-volatile storage for later execution.

In the example shown, system memory 606 can include various modules that include executable instructions to implement functionalities described herein. System memory 606 may include an operating system ("O/S") 632, as well as an application 636 and/or logic module(s) 659. In the example shown in FIG. 6, system memory 606 may include any number of modules 659, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques, including, but not limited to, FORTH, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, Javascript™ Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement at least one of the described techniques or variations thereof. Database management systems (i.e., "DBMS"), search facilities and platforms, web crawlers (i.e., computer programs that automatically or semi-automatically visit, index, archive or copy content from, various websites (hereafter referred to as "crawlers")), and other features may be implemented using various types of proprietary or open source technologies, including MySQL, Oracle (from Oracle of Redwood Shores, Calif.), Solr and Nutch from The Apache Software Foundation of Forest Hill, Md., among others and without limitation. The described techniques may be varied and are not limited to the examples or descriptions provided. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 659 of FIG. 6, or one or more of their components, or any process or device described herein, can be in communication (e.g., wired or wirelessly) with a mobile device, such as a mobile phone or computing device, or can be disposed therein.

The computing device may be disposed in autonomous vehicle 690*b* as autonomy controller 620*a*.

In some cases, a mobile device, or any networked computing device (not shown) in communication with one or more modules 659 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 659 or one or more of its/their components, or any process or device described herein, can be implemented in one or more computing devices (i.e., any mobile computing device) that may include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 659 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
   determining, by a processor, a position of an autonomous vehicle relative to a roadway over which the autonomous vehicle is configured to transit via a path of travel, wherein the path of travel comprises predetermined travel points corresponding to discrete geographic locations disposed along the path of travel;
   accessing, by the processor, map data to identify locations of one or more safe zones associated with each of the predetermined travel points along the path of travel;
   determining, by the processor, a set of driving instructions for a vehicle controller to autonomously control the autonomous vehicle along the path of travel;
   determining, by the processor prior to detecting any anomalous events associated with the autonomous vehicle or an environment external to the autonomous vehicle, one or more subsets of alternate driving instructions for the vehicle controller to autonomously control the autonomous vehicle to a safe zone of the one or more safe zones via a recovery path of travel from at least one of the predetermined travel points;
   controlling, autonomously by the vehicle controller, the autonomous vehicle along the path of travel based on the set of driving instructions;
   detecting, by the processor, an anomalous event associated with the autonomous vehicle or the environment external to the autonomous vehicle; and
   controlling, autonomously by the vehicle controller and in response to detecting the anomalous event, the autonomous vehicle based on a subset of the one or more subsets of alternate driving instructions to guide the autonomous vehicle to the safe zone of the one or more safe zones via the recovery path of travel.

2. The method of claim 1 further comprising:
   receiving, by the processor, images of the locations of the one or more safe zones captured via one or more cameras; and
   analyzing, by the processor, the images and the map data to confirm the locations of the one or more safe zones.

3. The method of claim 2 further comprising:
   analyzing, by the processor, the images and the map data for multiple travel points of the predetermined travel points along the path of travel;
   identifying, by the processor, a candidate safe zone of the one or more safe zones based on the map data;
   determining, by the processor, data representing an occlusion associated with the candidate safe zone; and
   excluding, by the processor, the candidate safe zone from being included in the one or more safe zones prior to detecting the anomalous event.

4. The method of claim 2 wherein analyzing the images and the map data comprises:
   receiving, by the processor, images of the locations as high definition ("HD") images; and
   analyzing, by the processor, the HD images and HD map data, which together constitutes the map data.

5. The method of claim 1 further comprising:
   selecting, by the processor, a location for one of the one or more safe zones prior to reaching the at least one of the predetermined travel points.

6. The method of claim 5 wherein selecting the location comprises:
   identifying, by the processor, a reference point representing a location of the autonomous vehicle; and
   predicting, by the processor, a subset of actions to guide the autonomous vehicle autonomously to the safe zone, at least one action including the subset of the one or more subsets of alternate driving instructions.

7. The method of claim 6 wherein predicting the subset of actions comprises:
   determining, by the processor, for the at least one action the subset of the one or more alternate driving instruction to navigate the autonomous vehicle over a portion of the recovery path of travel that excludes an object detected by the autonomous vehicle on the roadway.

8. The method of claim 1 further comprising:
   classifying, by the processor, the detected anomalous event based on a state of operation of a sensor;
   identifying, by the processor, one or more other sensors responsive to the state of operation of the sensor; and determining, by the processor, an event-specific subset of actions utilizing the one or more other sensors based on the detected anomalous event.

9. The method of claim 8 further comprising:
controlling, by the vehicle controller, the autonomous vehicle based on the event-specific subset of actions to navigate the autonomous vehicle to the safe zone via the recovery path of travel.

10. The method of claim 1 further comprising:
identifying, by the processor, data representing a glide path associated with the safe zone, the data representing the glide path including waypoints each of which is associated with executable instructions configured to receive sensor data and to guide the autonomous vehicle from a waypoint to the safe zone.

11. The method of claim 1 further comprising:
receiving, by the processor, a portion of the map data as updated map data including the executable instructions of at least one waypoint of the glide path; and
controlling, autonomously by the vehicle controller, the autonomous vehicle based on the executable instructions to navigate the autonomous vehicle via the glide path.

12. The method of claim 1 further comprising:
receiving, by the processor, images of the locations of the one or more safe zones captured via one or more cameras;
analyzing, by the processor, the images and the map data at multiple points along the path of travel;
identifying, by the processor, a candidate safe zone based on the map data;
determining, by the processor, data representing an obstacle associated with the candidate safe zone;
determining, by the processor, that the obstacle is an animal;
excluding, by the processor, the candidate safe zone from being included in the one or more safe zones prior to detecting the anomalous event.

13. The method of claim 3 further comprising:
transmitting, via a communication network, the data representing the occlusion to a computing device implemented as a portion of a vehicular autonomy platform to cause an update to a standard map.

14. The method of claim 1 further comprising:
detecting, by the processor, a manual vehicular drive control after detecting the anomalous event; and
preventing, by the processor and based on the detected manual vehicular drive control, control of the autonomous vehicle by the vehicle controller based on the subset of the one or more subsets of alternate driving instructions.

15. The method of claim 14, wherein detecting the manual vehicular drive control further comprises:
identifying, by the processor, a state in which a driver is intervening with the autonomous control of the autonomous vehicle while traveling via the recovery path of travel.

16. The method of claim 1 further comprising:
receiving, by the processor, images of regions associated with the path of travel captured via one or more cameras;
analyzing, by the processor, the images of at least one of the regions;
detecting, by the processor, one or more objects in the at least one region to form an obstructed region; and
identifying, by the processor, the safe zone as another region of the regions in which objects are absent.

17. A controller for an autonomous vehicle, comprising:
a memory including executable instructions; and
a processor, responsive to executing the instructions, is programmed to:
determine a position of the autonomous vehicle relative to a roadway to transit via a path of travel, wherein the path of travel comprises predetermined travel points corresponding to discrete geographic locations disposed along the path of travel;
access map data to identify locations of one or more safe zones associated with each of the predetermined travel points along the path of travel;
determine driving instructions for autonomously controlling the autonomous vehicle along the path of travel;
determine, prior to detecting any anomalous events associated with the autonomous vehicle or an environment external to the autonomous vehicle, one or more subsets of alternate driving instructions for the autonomous vehicle to autonomously navigate to a safe zone of the one or more safe zones via a recovery path of travel from at least one of the predetermined travel points;
control the autonomous vehicle along the path of travel based on the driving instructions;
detect an anomalous event associated with the autonomous vehicle or the environment external to the autonomous vehicle; and
control autonomously by the vehicle controller and in response to detecting the anomalous event, the autonomous vehicle based on a subset of the one or more subsets of alternate driving instructions to guide the autonomous vehicle to the safe zone of the one or more safe zones via the recovery path of travel.

18. The apparatus of claim 17, wherein the processor is further configured to:
receive images of the locations of the one or more safe zones captured via one or more cameras; and
analyze the images and the map data to confirm the locations of the one or more safe zones.

19. The apparatus of claim 18, wherein the processor is further configured to:
analyze the images and the map data at multiple points along the path of travel;
identify a candidate safe zone based on the map data;
determine data representing an occlusion associated with the candidate safe zone; and
exclude the candidate safe zone from being included in the one or more safe zones prior to detecting the anomalous event.

20. The apparatus of claim 17, wherein the processor is further configured to:
classify the detected anomalous event based on a state of operation of a sensor;
identify one or more other sensors responsive to the state of operation of the sensor;
determine an event-specific subset of actions implementing the one or more other sensors based on the detected anomalous event; and
control the autonomous vehicle based on the event-specific subset of actions to navigate the autonomous vehicle to the safe zone via the recovery path of travel.

* * * * *